US008334934B2

(12) United States Patent
Nobori et al.

(10) Patent No.: US 8,334,934 B2
(45) Date of Patent: Dec. 18, 2012

(54) IMAGE DISPLAY DEVICE AND IMAGE DISPLAY METHOD

(75) Inventors: Tatsuhiko Nobori, Matsumoto (JP); Fumio Koyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 249 days.

(21) Appl. No.: 12/887,974

(22) Filed: Sep. 22, 2010

(65) Prior Publication Data

US 2011/0012915 A1 Jan. 20, 2011

Related U.S. Application Data

(63) Continuation of application No. 11/448,072, filed on Jun. 7, 2006, now Pat. No. 7,911,544.

(30) Foreign Application Priority Data

Jul. 8, 2005 (JP) ................................. 2005-200570
May 17, 2006 (JP) ................................. 2006-137248

(51) Int. Cl.
*H04N 9/69* (2006.01)
*G09G 5/02* (2006.01)

(52) U.S. Cl. ........ 348/757; 348/750; 348/756; 345/600; 345/601

(58) Field of Classification Search .................. 348/750, 348/756, 757; 345/589, 600, 601
See application file for complete search history.

(56) References Cited

U.S. PATENT DOCUMENTS

| | | | | |
|---|---|---|---|---|
| 5,751,378 | A | 5/1998 | Chen et al. | |
| 6,783,241 | B2 * | 8/2004 | Miyawaki et al. | 353/20 |
| 6,795,053 | B1 | 9/2004 | Funamoto et al. | |
| 6,947,025 | B2 | 9/2005 | Iisaka et al. | |
| 6,952,235 | B2 | 10/2005 | Park et al. | |
| 7,095,451 | B2 | 8/2006 | Kitazawa et al. | |
| 7,136,044 | B2 | 11/2006 | Sasaki | |
| 7,199,840 | B2 | 4/2007 | Shiota | |
| 7,277,079 | B2 | 10/2007 | Kobayashi et al. | |
| 7,287,860 | B2 | 10/2007 | Yoshida et al. | |
| 7,576,711 | B2 | 8/2009 | An | |
| 7,639,220 | B2 * | 12/2009 | Yoshida et al. | 345/87 |
| 7,911,544 | B2 * | 3/2011 | Nobori et al. | 348/757 |
| 7,965,342 | B2 * | 6/2011 | Nobori | 348/687 |
| 2004/0001165 | A1 | 1/2004 | Shiota et al. | |
| 2004/0008267 | A1 | 1/2004 | Chen et al. | |
| 2004/0248022 | A1 | 12/2004 | Yoshida et al. | |
| 2005/0007390 | A1 | 1/2005 | Yoshida et al. | |
| 2005/0270268 | A1 | 12/2005 | Iisaka et al. | |
| 2006/0268180 | A1 | 11/2006 | Chou | |
| 2007/0025683 | A1 | 2/2007 | Nobori | |
| 2007/0065008 | A1 | 3/2007 | Kao et al. | |
| 2007/0285574 | A1 | 12/2007 | Nobori | |
| 2008/0036872 | A1 * | 2/2008 | Nobori | 348/222.1 |
| 2010/0060556 | A1 * | 3/2010 | Yoshida et al. | 345/83 |

FOREIGN PATENT DOCUMENTS

| | | | |
|---|---|---|---|
| CN | 1304522 | A | 7/2001 |
| CN | 1413019 | A | 4/2003 |
| CN | 1463534 | A | 12/2003 |
| CN | 1476718 | A | 2/2004 |
| CN | 1622638 | A | 6/2005 |
| CN | 1625763 | A | 6/2005 |
| JP | A-2001-166739 | | 6/2001 |
| JP | A-2001-343957 | | 12/2001 |
| JP | A-2002-366121 | | 12/2002 |
| JP | A-2004-045634 | | 2/2004 |
| JP | A-2004-163518 | | 6/2004 |
| JP | A-2004-282661 | | 10/2004 |
| JP | A-2004-294784 | | 10/2004 |
| JP | A-2004-333758 | | 11/2004 |
| JP | A-2005-077868 | | 3/2005 |
| JP | A-2005-184048 | | 7/2005 |
| JP | A-2006-025263 | | 1/2006 |
| JP | A-2006-120030 | | 5/2006 |
| WO | WO 03/032080 | A1 | 4/2003 |

* cited by examiner

*Primary Examiner* — My-Chau T Tran
(74) *Attorney, Agent, or Firm* — Oliff & Berridge, PLC

(57) ABSTRACT

Technology for carrying out a luminance range expansion process is provided. In the technology, the luminance range expansion process is carried out in a manner appropriate to the luminance histogram of image data. Using the white peak value WP which represents the maximum value of luminance and the APL which represents the mean value thereof in the luminance histogram of image data, an expansion coefficient for use in the luminance range expansion process is derived by referring to an expansion coefficient lookup table 210. On the basis of the expansion coefficient, the luminance range expansion process is performed on the image data.

9 Claims, 13 Drawing Sheets

CASE WHERE dW(n)=dW1(k)*ScaleG(n)

IMAGE DISPLAY DEVICE AND IMAGE DISPLAY METHOD

This is a Continuation of application Ser. No. 11/448,072 filed Jun. 7, 2006, now U.S. Pat. No. 7,911,544 B2. The disclosure of the prior application is hereby incorporated by reference herein in its entirety.

BACKGROUND

1. Technical Field

The present invention relates to technology for displaying images on the basis of image data.

2. Related Art

There have been proposed technologies for use in projectors and other such image display devices, to improve the subjective contrast of images by means of performing an expansion process to extend the luminance range of image data (hereinafter termed "luminance range expansion process").

However, where image data is subjected to a conventional luminance range expansion process, the overexposure may occur and a majority of the pixels in the image as a whole may become white, with the possibility that image quality will actually become worse.

In order to address the problem mentioned above, technology is provided by which the luminance range expansion process is carrying out in a manner appropriate to the luminance histogram of image data.

The present invention is related to Japanese patent applications No. 2005-200570, filed Jul. 8, 2005, No. 2005-216677, filed Jul. 27, 2005, No. 2006-80231, filed Mar. 23, 2006 and No. 2006-137248, filed May 17, 2006; the contents of which are incorporated herein by reference.

SUMMARY

An aspect of the present invention is an image display device for displaying an image on the basis of image data. The image display device has an image feature quantity calculating portion which calculates a plurality of image feature quantities based on a luminance histogram of the image data; an expansion coefficient determining portion which determines an expansion coefficient based on the plurality of image feature quantities by referring to a predetermined expansion coefficient lookup table; and a luminance range expansion processing portion which performs a luminance range expansion process on the image data using the expansion coefficient. The luminance range expansion process is a process to extend a range of luminances of the image data.

According to the aspect of the present invention, it is possible to carry out the luminance range expansion process in a manner appropriate to the luminance histogram of image data.

The luminance histogram may preferably be a frequency distribution of mean luminance values of pixels in a plurality of small regions into which an area of the image has been divided.

In such an arrangement, since mean luminance values within small regions are used, the effects of image noise in the luminance range expansion process can be lessened.

It is preferable that the plurality of image feature quantities include a white peak value and at least one of a mean value of the luminance histogram and a minimum value of the luminance histogram. The white peak value represents a maximum luminance in the luminance histogram.

In case where the image data is moving picture data, the following arrangement may be preferable. In the arrangement, the expansion coefficient determining portion determines the expansion coefficient for each frame of the moving picture data by referring to the predetermined expansion coefficient lookup table. The image display device further has an expansion correcting portion. The expansion correcting portion determines an expansion modification volume of which an absolute value is smaller than an absolute value of an ideal expansion modification volume, and generates a current frame expansion coefficient by correcting the current frame ideal expansion coefficient using the expansion modification volume. The ideal expansion modification volume is a differential of a current frame ideal expansion coefficient from a previous frame expansion coefficient. The current frame ideal expansion coefficient is an expansion coefficient determined by the expansion coefficient determining portion based on the plurality of image feature quantities of a current frame referring to the predetermined expansion coefficient lookup table. The previous frame expansion coefficient is an expansion coefficient used in the luminance range expansion process of a previous frame. The luminance range expansion processing portion performs the luminance range expansion process on the image data based on the current frame expansion coefficient as the expansion coefficient.

In such an arrangement, a sharp change in the expansion coefficient from the previous frame can be prevented.

The following arrangement may be preferable. In case where an absolute value of a previous expansion modification volume is smaller than a predetermined threshold, the expansion correcting portion determines a first value as the expansion modification volume based on the ideal expansion modification volume. The previous expansion modification volume is a differential of the previous frame expansion coefficient from a previous frame ideal expansion coefficient. The previous frame ideal expansion coefficient is an expansion coefficient determined by the expansion coefficient determining portion based on the plurality of image feature quantities of the previous frame referring to the predetermined expansion coefficient lookup table. Whereas in case where the absolute value of the previous expansion modification volume is equal to or greater than the predetermined threshold, the expansion correcting portion determines a second value as the expansion modification volume based on the ideal expansion modification volume. An absolute value of the second value is greater than an absolute value of the first value in case where the ideal expansion modification volumes are same.

In such arrangement, in the event that the absolute value of the expansion coefficient differential prior and subsequent to correction in the previous frame is equal to or greater than the threshold, the absolute value of the expansion modification volume can be made larger, as compared to the case where the absolute value is smaller than the threshold value.

The following arrangement may be more preferable. In case where the absolute value of the previous expansion modification volume is equal to or greater than the predetermined threshold and the ideal expansion modification volume is a positive value, the expansion correcting portion determines a third value as the second value. Whereas in case where the absolute value of the previous expansion modification volume is equal to or greater than the predetermined threshold and the ideal expansion modification volume is a negative value, the expansion correcting portion determines a fourth value as the second value. An absolute value of the fourth value is greater than an absolute value of the third value in case where the ideal expansion modification volumes are same.

In such an arrangement, in the event that the ideal expansion modification volume is a negative value, the current frame expansion coefficient can be calculated using the expansion modification volume such that the absolute value of the expansion modification volume is greater than it would be if the ideal expansion modification volume were a positive value the same as the absolute value.

In case where the image data is moving picture data, the following arrangement may be preferable. In the arrangement, the expansion coefficient determining portion determines the expansion coefficient for each frame of the moving picture data by referring to the predetermined expansion coefficient lookup table. The image display device further has an expansion substituting portion. In case where a current frame ideal expansion coefficient equals a second previous frame ideal expansion coefficient, but does not equal a first previous frame ideal expansion coefficient, the expansion substituting portion substitutes the current frame ideal expansion coefficient with a first previous frame expansion coefficient to generate a current frame expansion coefficient. The luminance range expansion processing portion performs the luminance range expansion process on the image data using the current frame expansion coefficient as the expansion coefficient. The current frame ideal expansion coefficient is an expansion coefficient determined by the expansion coefficient determining portion based on the plurality of image feature quantities of a current frame referring to the predetermined expansion coefficient lookup table. The first previous frame ideal expansion coefficient is an expansion coefficient determined by the expansion coefficient determining portion based on the plurality of image feature quantities of a frame previous by one the current frame referring to the predetermined expansion coefficient lookup table. The second previous frame ideal expansion coefficient is an expansion coefficient determined by the expansion coefficient determining portion based on the plurality of image feature quantities of a frame previous by two the current frame referring to the predetermined expansion coefficient lookup table. The first previous frame expansion coefficient is an expansion coefficient used in the luminance range expansion process of the frame previous by one the current frame.

In such an arrangement, in the event that the expansion coefficient of the current frame derived by the expansion coefficient determining portion equals the expansion coefficient of the frame previous by two the current frame derived by the expansion coefficient determining portion, but does not equal the expansion coefficient of the frame previous by one the current frame derived by the expansion coefficient determining portion, the expansion coefficient can remain unchanged from the expansion coefficient used in the luminance range expansion process of the frame previous by one.

The image display device may further have a lighting device; a modulation coefficient determining portion which determines a modulation coefficient based on the plurality of image feature quantities by referring to a predetermined modulation coefficient lookup table, the modulation coefficient representing a brightness of light of the lighting device; and a light modulating portion which modulates the light of the lighting device based on the modulation coefficient.

In such arrangement, modulation can be carried out according to the plurality of image feature quantities relating to the luminance histogram of the image data, whereby it is possible to carry out the luminance range expansion process in a manner appropriate to the luminance histogram of image data.

It is preferable that the expansion coefficient lookup table and the modulation coefficient lookup table are set up such that maximum luminance of the image is unchanged prior and subsequent to execution of both the luminance range expansion process and modulation.

By so doing, by deriving the expansion coefficients and modulation coefficients using the expansion coefficient lookup table and the modulation coefficient lookup table, maximum luminance of the image can remain unchanged prior and subsequent to execution of both the luminance range expansion process and modulation.

The image display device may further have a lighting device; an image feature quantity calculating portion which calculates a plurality of image feature quantities based on a luminance histogram of the image data; a modulation coefficient determining portion which determines a modulation coefficient based on the plurality of image feature quantities by referring to a predetermined modulation coefficient lookup table, the modulation coefficient representing a brightness of light of the lighting device; and a light modulating portion which modulates the light of the lighting device based on the modulation coefficient.

In such an arrangement, modulation can be carried out according to the plurality of image feature quantities relating to the luminance histogram of the image data, whereby it is possible to carry out modulation in a manner appropriate to the luminance histogram of image data.

In above arrangement, the luminance histogram may be a frequency distribution of mean luminance values of a plurality of small regions into which an area of the image has been divided.

By so doing, since mean luminance values within small regions are used, the effects of image noise in modulation can be lessened.

In above mentioned arrangement, the plurality of image feature quantities may include: a white peak value; and at least one of a mean value of the luminance histogram and a minimum value of the luminance histogram.

In case where the image data is moving picture data, the following arrangement may be preferable. The modulation coefficient determining portion determines the modulation coefficient for each frame of the moving picture data by referring to the predetermined modulation coefficient lookup table. The image display device further has a modulation correcting portion. The modulation correcting portion determines a modulation modification volume of which an absolute value is smaller than an absolute value of an ideal modulation modification volume, and generates a current frame modulation coefficient by correcting the current frame ideal modulation coefficient using the modulation modification volume. The ideal modulation modification volume is a differential of a current frame ideal modulation coefficient from a previous frame modulation coefficient. The current frame ideal modulation coefficient is a modulation coefficient determined by the modulation coefficient determining portion based on the plurality of image feature quantities of a current frame referring to the predetermined modulation coefficient lookup table. The previous frame modulation coefficient is a modulation coefficient used in the modulation for a previous frame. The light modulating portion modulates the light for the current frame based on the current frame modulation coefficient as the modulation coefficient.

In such an arrangement, a sharp change in the modulation coefficient from the previous frame can be prevented.

The following arrangement may be preferable. In case where an absolute value of a previous modulation modification volume is smaller than a predetermined threshold, the modulation correcting portion determines a first value as the modulation modification volume based on the ideal modulation modification volume. The previous modulation modification volume is a differential of the previous frame modulation coefficient from a previous frame ideal modulation coefficient. The previous frame ideal modulation coefficient is a modulation coefficient determined by the modulation coefficient determining portion based on the plurality of image feature quantities of the previous frame referring to the predetermined modulation coefficient lookup table. Whereas in case where the absolute value of the previous modulation modification volume is equal to or greater than the predetermined threshold, the modulation correcting portion determines a second value as the modulation modification volume based on the ideal modulation modification volume. An absolute value of the second value is greater than an absolute value of the first value in case where the ideal modulation modification volumes are same.

In such an arrangement, in the event that the absolute value of the modulation coefficient differential prior and subsequent to correction in the previous frame is equal to or greater than the threshold value, the absolute value of the modulation coefficient differential can be made larger, as compared to the case where the absolute value is smaller than the threshold value.

The following arrangement may be more preferable. In case where the absolute value of the previous modulation modification volume is equal to or greater than the predetermined threshold and the ideal modulation modification volume is a positive value, the modulation correcting portion determines a third value as the second value. Whereas in case where the absolute value of the previous modulation modification volume is equal to or greater than the predetermined threshold and the ideal modulation modification volume is a negative value, the modulation correcting portion determines a fourth value as the second value. An absolute value of the fourth value is greater than an absolute value of the third value in case where the ideal modulation modification volumes are same.

In such an arrangement, in the event that the ideal modulation coefficient differential is a negative value, the current frame modulation coefficient can be calculated using the modulation coefficient differential such that the absolute value of the modulation coefficient differential is greater than it would be if the ideal modulation coefficient differential were a positive value the same as the absolute value.

In case where the image data is moving picture data, the following arrangement may be preferable. The modulation coefficient determining portion determines the modulation coefficient for each frame of the moving picture data by referring to the predetermined modulation coefficient lookup table. The image display device further has a modulation substituting portion. In case where a current frame ideal modulation coefficient equals a second previous frame ideal modulation coefficient, but does not equal a first previous frame ideal modulation coefficient, the modulation substituting portion substitutes the current frame ideal modulation coefficient with a first previous frame modulation coefficient to generate a current frame modulation coefficient. The current frame ideal modulation coefficient is a modulation coefficient determined by the modulation coefficient determining portion based on the plurality of image feature quantities of a current frame referring to the predetermined modulation coefficient lookup table. The first previous frame ideal modulation coefficient is a modulation coefficient determined by the modulation coefficient determining portion based on the plurality of image feature quantities of a frame previous by one the current frame referring to the predetermined modulation coefficient lookup table. The second previous frame ideal modulation coefficient is a modulation coefficient determined by the modulation coefficient determining portion based on the plurality of image feature quantities of a frame previous by two the current frame referring to the predetermined modulation coefficient lookup table. The first previous frame modulation coefficient is a modulation coefficient used in the modulation for the frame previous by one the current frame. The light modulating portion modulates the light for the current frame based on the current frame modulation coefficient as the modulation coefficient.

In such an arrangement, in the event that the modulation coefficient of the current frame derived by the modulation coefficient determining portion equals the modulation coefficient of the frame previous by two the current frame derived by the modulation coefficient determining portion, but does not equal the modulation coefficient of the frame previous by one the current frame derived by the modulation coefficient determining portion, the modulation coefficient can remain unchanged from the expansion coefficient used in the luminance range expansion process of the frame previous by one.

The present invention may be reduced to practice in various forms, for example, an image display method, a computer program for accomplishing the functions of such a method or device, or a recording medium having the program recorded thereon.

These and other objects, features, aspects, and advantages of the present invention will become more apparent from the following detailed description of the preferred embodiments with the accompanying drawings.

DESCRIPTION OF EXEMPLARY EMBODIMENTS

A. Embodiment 1

Figure 1:
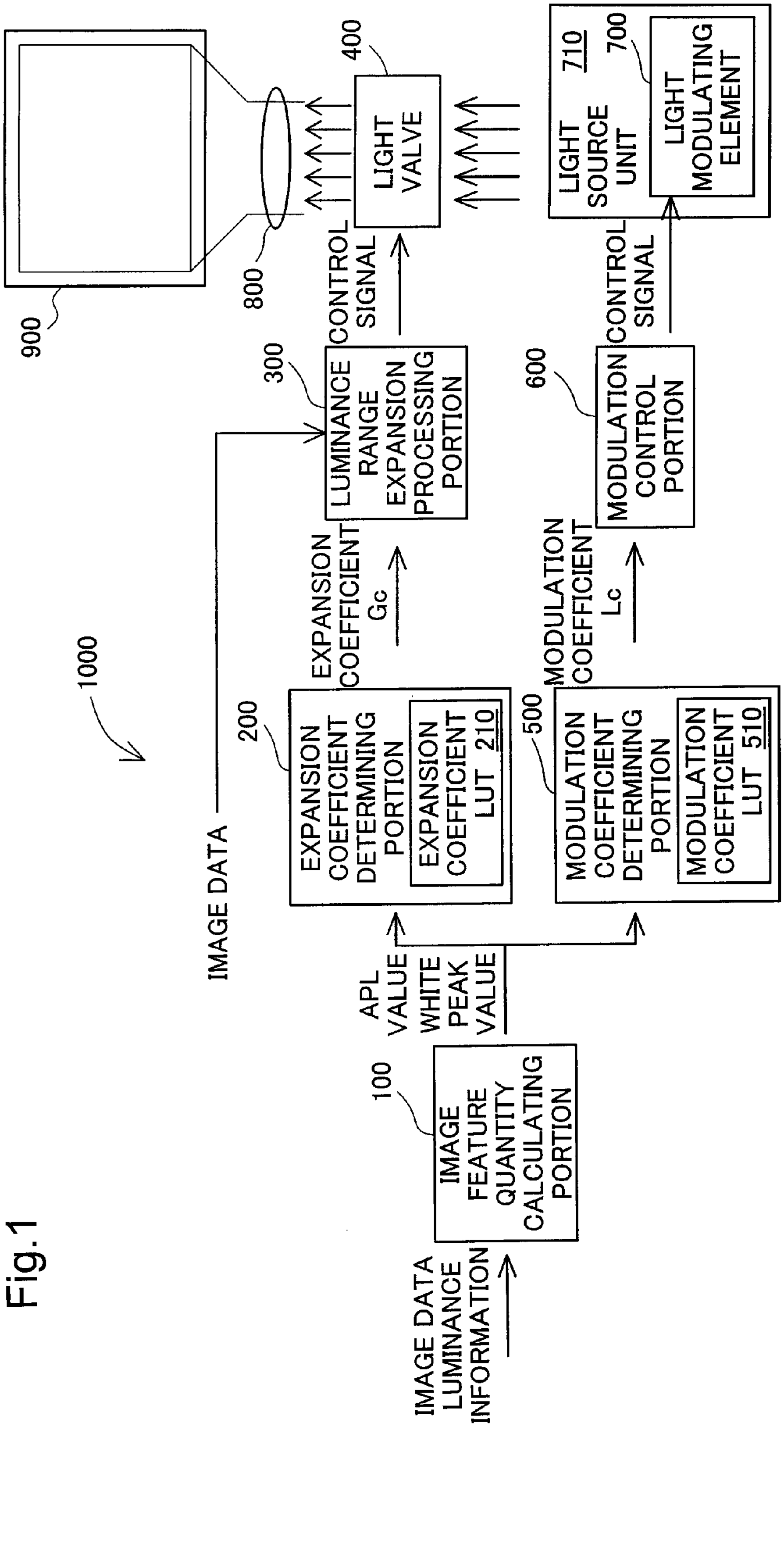
FIG. 1 is a block diagram of the image display device 1000.

FIG. 1 is a block diagram of an image display device 1000 pertaining to Embodiment 1 of the invention. The image display device 1000 has the function of executing, according to image feature quantities of the image data, a luminance range expansion process for extending the range of luminance of the image data, and modulation control of a light source unit 710. The image display device may consist either of still image data, or a single frame of moving picture data.

The image display device 1000 is a projector for projecting images onto a screen 900, and comprising an image feature quantity calculating portion 100, an expansion coefficient determining portion 200, a luminance range expansion processing portion 300, a light valve 400, a modulation coefficient determining portion 500, a modulation control portion 600, the light source unit 710, and a projection optical system 800. The light source unit 710 comprises a light modulating element 700 composed of switching transistors, for example. The light source unit 710 corresponds to the lighting device of the invention, and the light modulating element 700 corresponds to the light modulating portion of the invention. The light modulating portion is not limited to a light modulating element, and may instead be louvers that are set in front of the light source unit 710, and are opened and closed to regulate the brightness.

The image feature quantity calculating portion 100 calculates an APL (Average Picture Level) value and a white peak value on the basis of the luminance of the image data. The APL value and the white peak value will be discussed in detail later. Using the APL value and the white peak value, the expansion coefficient determining portion 200 refers to an expansion coefficient lookup table (hereinafter denoted as LUT) 210 in order to derive an expansion coefficient Gc. The luminance range expansion processing portion 300 performs the luminance range expansion process on the image data on the basis of the expansion coefficient Gc, and controls the light valve 400 on the basis of the image data subsequent to the luminance range expansion process. The modulation coefficient determining portion 500, using the APL value and the white peak value, refers to a modulation coefficient lookup table 510 in order to derive a modulation coefficient Lc. On the basis of the modulation coefficient Lc, the modulation control portion 600 controls the light modulating element 700 of a discharge lamp.

The image feature quantity calculating portion 100 calculates the APL value and the white peak value on the basis of the luminance of the image data. The luminance Y of one pixel of image data can be defined by the following Equation (1) or (2), for example.

$$Y=0.299R+0.58G+0.144B \tag{1}$$

$$Y=\max(R,G,B) \tag{2}$$

Figure 2:
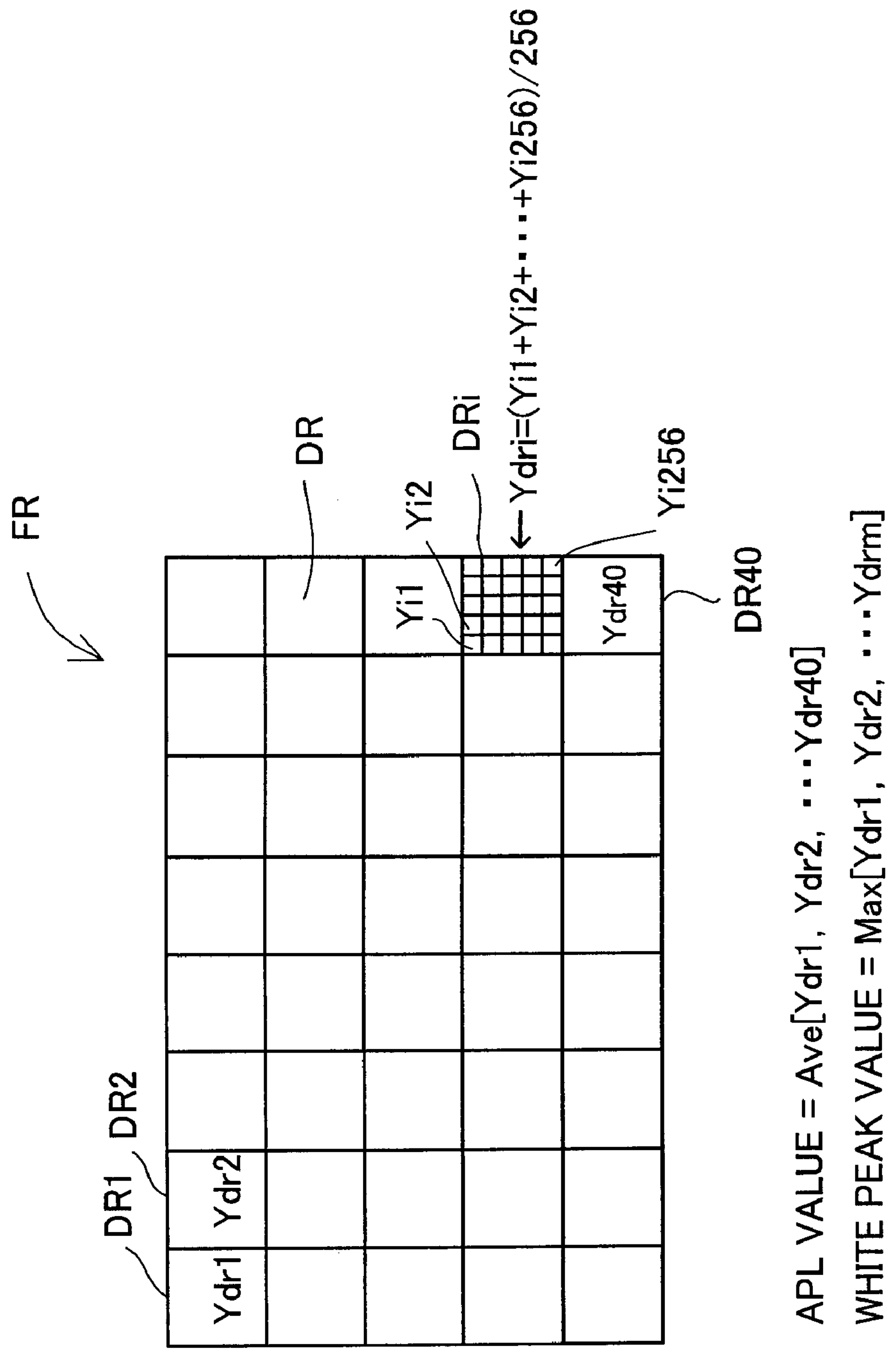
FIG. 2 illustrates the process by the image feature quantity calculating portion 100.

FIG. 2 illustrates processing by the image feature quantity calculating portion 100. The image feature quantity calculating portion 100 first divides a single frame FR into small regions DR of 16×16 pixels. In the example of FIG. 2, the single frame FR is divided into 40 small regions DR1-DR40. Where the luminance of each pixel within an i-th small region DRi (i=1 to 40) selected from among the 40 small regions DR1-DR40 is denoted as Yi1-Yi256, the representative luminance Ydri of the small region DRi is represented by the following Equation (3).

$$Ydri=(Yi1+Yi2+\ldots+Yi256)/256 \tag{3}$$

That is, the representative luminance Ydri of the small region DRi is the mean value of the luminances of the pixels within the small region DRi. In FIG. 2, the small region DRi is portrayed as having a pixel count of 25, but actually there are 256 pixels. The image feature quantity calculating portion 100 calculates representative luminances Ydr1-Ydr40 for the small regions DR1-DR40 by Equation (3). The image feature quantity calculating portion 100 then designates the mean value of the representative luminances Ydr1-Ydr40 as the APL value, and the maximum value of the representative luminances Ydr1-Ydr40 as the white peak value WP. Here, the APL value and the white peak value WP are represented on 10 bits. The size and number of small regions DR can be established arbitrarily.

Using this APL value and the white peak value WP, the expansion coefficient determining portion 200 refers to the expansion coefficient LUT 210 and derives the expansion coefficient Gc (See FIG. 1). The range of expansion coefficients Gc can be set to any desired range, e.g. to 0-255.

Figure 3:
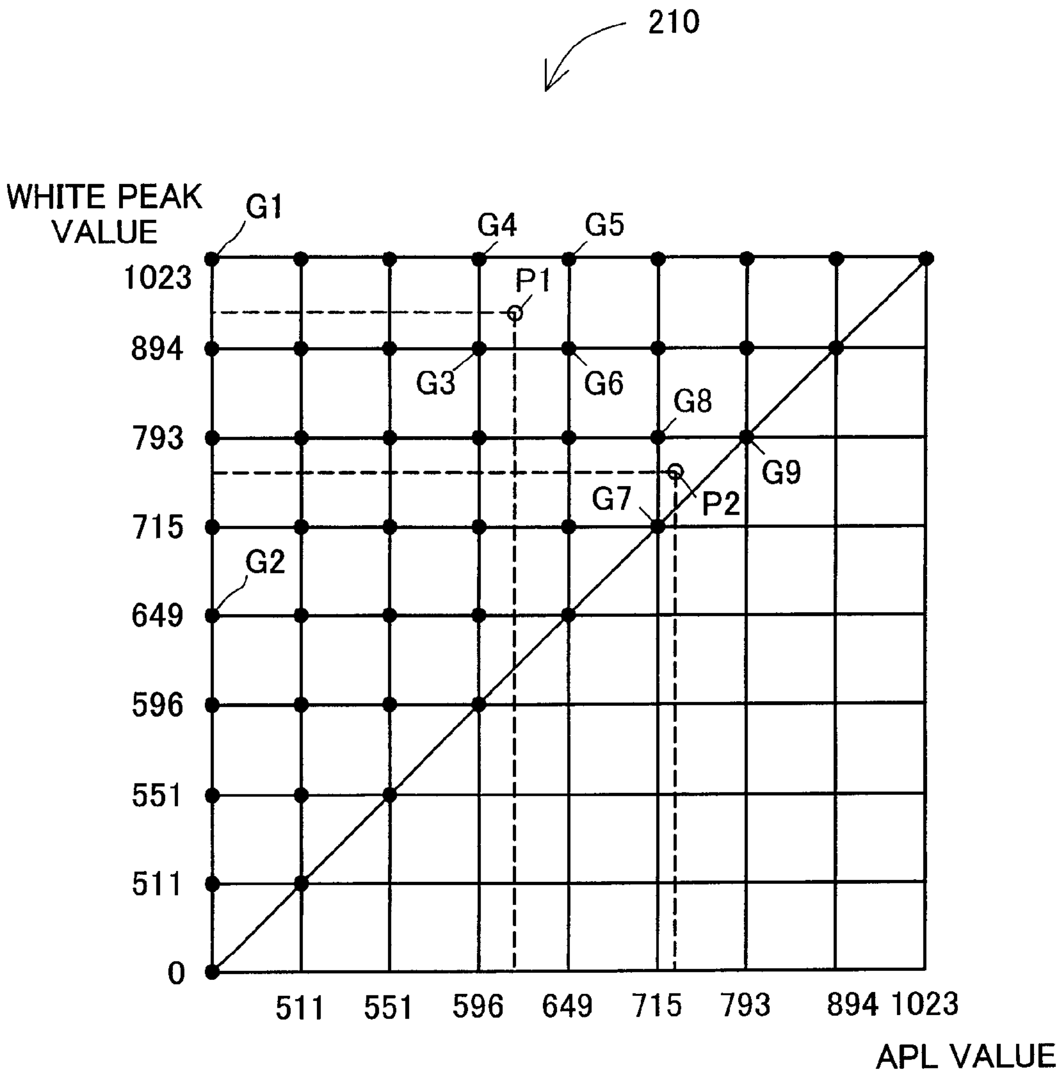
FIG. 3 illustrates exemplary input grid points in the expansion coefficient LUT 210.

FIG. 3 is an illustration depicting exemplary input grid points in the expansion coefficient LUT 210. The horizontal axis in FIG. 3 gives the APL value, and the vertical axis gives the white peak value WP. Individual expansion coefficients Gc are stored at the locations of the input grid points indicated by the black dots in FIG. 3. For example, an expansion coefficient Gc=0 is stored at input grid point G1, and an expansion coefficient Gc=148 is stored at input grid point G2. Since the APL value never exceeds the white peak value WP, expansion coefficients Gc are not stored at input grid points in the lower right half of the expansion coefficient LUT 210, and it is possible thereby to reduce the amount of memory needed.

In the event that a combination of an APL value and a white peak value WP corresponds to any of the input grid points (black dots) in FIG. 3, the expansion coefficient determining portion 200 reads out and uses as-is the expansion coefficient Gc at that input grid point. In the event that a combination of an APL value and a white peak value WP does not correspond to any of the input grid points, for example, in the case of coordinate P1 or coordinate P2 in FIG. 3, the expansion coefficient Gc will be derived through an interpolation calculation. There are two kinds of interpolation calculations: a 4-point interpolation calculation used where coordinates are surrounded by four input grid points G3-G6 as with coordinates P1; and a 3-point interpolation calculation used where coordinates are surrounded by three input grid points G7-G9 as with coordinates P2.

Figure 4:
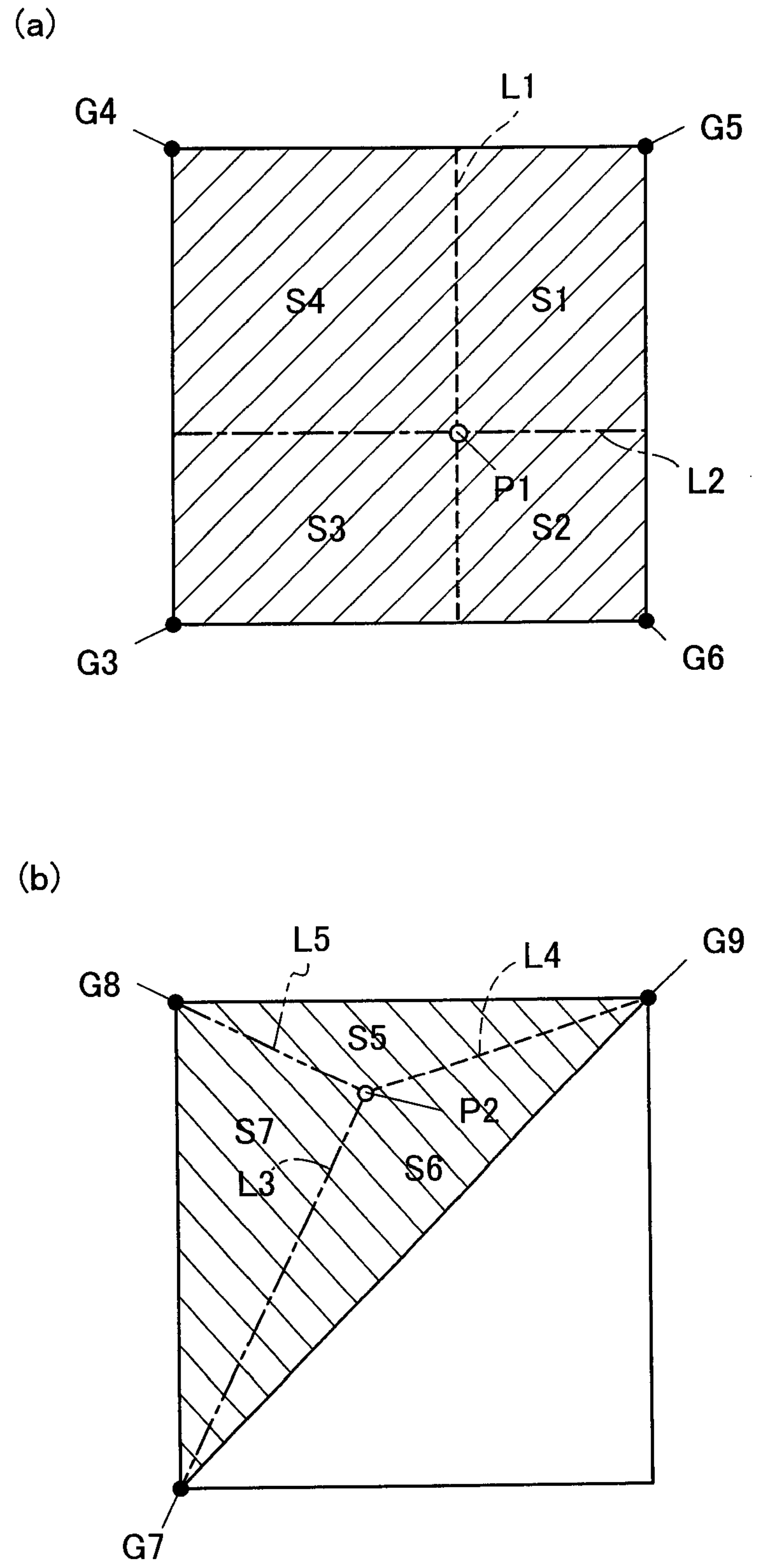
FIG. 4 illustrates interpolation calculations.

FIG. 4 illustrates interpolation calculations. A 4-point interpolation calculation is shown in FIG. 4(*a*), and a 3-point interpolation calculation is shown in FIG. 4(*b*). Hereinbelow the expansion coefficient values of input grid points G3-G9 shall be denoted as Gv3-Gv9. The areas S1-S4 in FIG. 4(*a*) represent areas of a region divided by segments L1, L2 that each pass through the coordinates P1; where area S is the area of the entire crosshatched region, the expansion coefficient Gp1 of the coordinates P1 is computed with Equation (4) below.

$$Gp1=(Gv3*S1+Gv4*S2+Gv5*S3+Gv6*S4)/S \tag{4}$$

The areas S5-S7 in FIG. 4, on the other hand, represent areas of a region divided by segments L3-L5 that each pass through the coordinates P2; where area Sa is the area of the entire crosshatched region, the expansion coefficient Gp2 of the coordinates P2 is computed with Equation (5) below.

$$Gp2=(Gv7*S5+Gv8*S6+Gv9*S7)/Sa \tag{5}$$

The luminance range expansion processing portion 300 expands the distribution range of the luminance of the image data based on the expansion coefficient Gc which has been calculated by the expansion coefficient determining portion 200. This luminance range expansion process is carried out with Equations (6a)-(6d) below. Here, R0, G0, B0 represent values of color information of the image data prior to the luminance range expansion process, and R1, G1, B1 represent values of color information of the image data subsequent to the luminance range expansion process. The expansion rate K1 is given by Equation (6d).

$$R1=K1*R0 \tag{6a}$$

$$G1=K1*G0 \tag{6b}$$

$$B1=K1*B0 \tag{6c}$$

$$K1=1+Gc/255 \tag{6d}$$

Since the expansion coefficient Gc is 0 or greater, the expansion rate K1 is 1 or greater.

The luminance range expansion processing portion 300 controls the light valve 400 on the basis of the image data subsequent to the luminance range expansion process.

Figure 5:
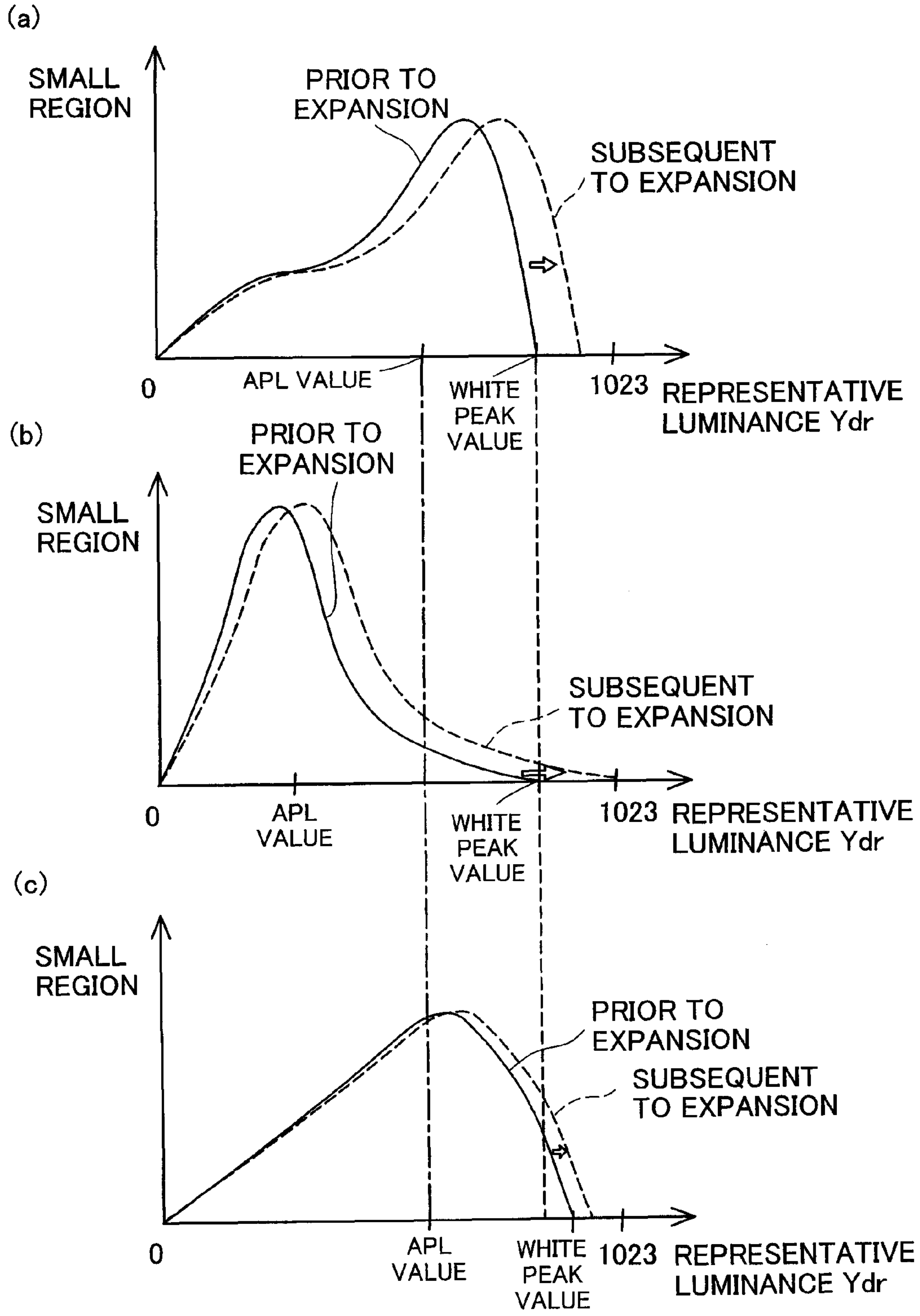
FIG. 5 illustrates a conceptual approach to establishing the expansion coefficient Gc.

The expansion coefficient Gc of the expansion coefficient LUT 210 can be established on a basis such as the following. FIG. 5 illustrates a conceptual approach to establishing the expansion coefficient Gc. In FIG. 5(*a*)-(*c*), the horizontal axis gives the representative luminance Ydri of the i-th small region DRi, and the vertical axis gives the number of small regions DR. That is, the luminance histograms of (a)-(c) in FIG. 5 are frequency distributions of representative luminance Ydri of the i-th small region DRi. In FIG. 5(*a*)-(*c*), the solid line graphs indicate luminance histograms of image data prior to the luminance range expansion process; white peak values WP and APL values of image data prior to the luminance range expansion process are indicated.

Prior to the luminance range expansion process, the image data in (a) and (b) of FIG. 5 have identical white peak values WP but different APL values. In the image data depicted in FIG. 5(*a*), the APL value is closer to the white peak value WP than in the case depicted in FIG. 5(*b*), so the luminance of the image as a whole is close to the white peak value WP in the image data depicted in FIG. 5(*a*). Accordingly, in order to prevent the occurrence of overexposure or whiteout whereby a majority of pixels in the image as a whole become white, the expansion coefficients Gc for the image data depicted in FIG. 5(*a*) in the expansion coefficient LUT 210 will be set so as to smaller than for the image data depicted in FIG. 5(*b*). In the image data depicted in FIG. 5(*b*), the APL value is smaller than that in FIG. 5(*a*), and the proportion of pixels having luminance close to the white peak value WP is small, so even if the luminance range expansion process were carried out with large expansion coefficients Gc, substantially no overexposure would occur. Accordingly, in order to produce high luminance of the image as a whole, larger expansion coefficients Gc for the image data in FIG. 5(*b*) will be established than for the image data in FIG. 5(*a*). The broken line graphs of (a) and (b) in FIG. 5 indicate luminance histograms of image data subsequent to the luminance range expansion process using expansion coefficients Gc established in this way. In FIG. 5(*a*), since the expansion coefficients Gc are small, the likelihood of overexposure occurring in the image data subsequent to the luminance range expansion process is low; and in FIG. 5(*b*) since the expansion coefficients Gc are large, it is possible to extend further the luminance range of the image data, as compared to the case of FIG. 5(*a*).

Prior to the luminance range expansion process, the image data in FIG. 5(*a*) and the image data in FIG. 5(*c*) have the same APL values but different white peak values WP. In the image data depicted in FIG. 5(*c*), the white peak value WP is greater than that in FIG. 5(*a*), so in order to prevent overexposure from occurring, the expansion coefficients Gc for the image data in FIG. 5(*c*) in the expansion coefficient LUT 210 are set to smaller values than for the image data in FIG. 5(*a*). The broken line graph of FIG. 5(*c*) indicates the luminance histogram of image data subsequent to the luminance range expansion process using expansion coefficients Gc established in this way. In FIG. 5(*c*), since the expansion coefficients Gc are smaller, the likelihood of overexposure occurring in the image data subsequent to the luminance range expansion process can be minimized.

As described above, the expansion coefficient LUT 210 is set up in consideration of APL values, white peak values WP and relationships among the two. In any of the cases depicted in (a)-(c) in FIG. 5, the image data subsequent to the luminance range expansion process has a wider range of luminance of the image data, as compared to the image data prior to the luminance range expansion process.

Using this APL value and the white peak value WP, the modulation coefficient determining portion 500 refers to the modulation coefficient LUT 510 and derives the expansion coefficient Lc (See FIG. 1). The range of expansion coefficients Lc can be set to any desired range, e.g. to 0-255.

Figure 6:
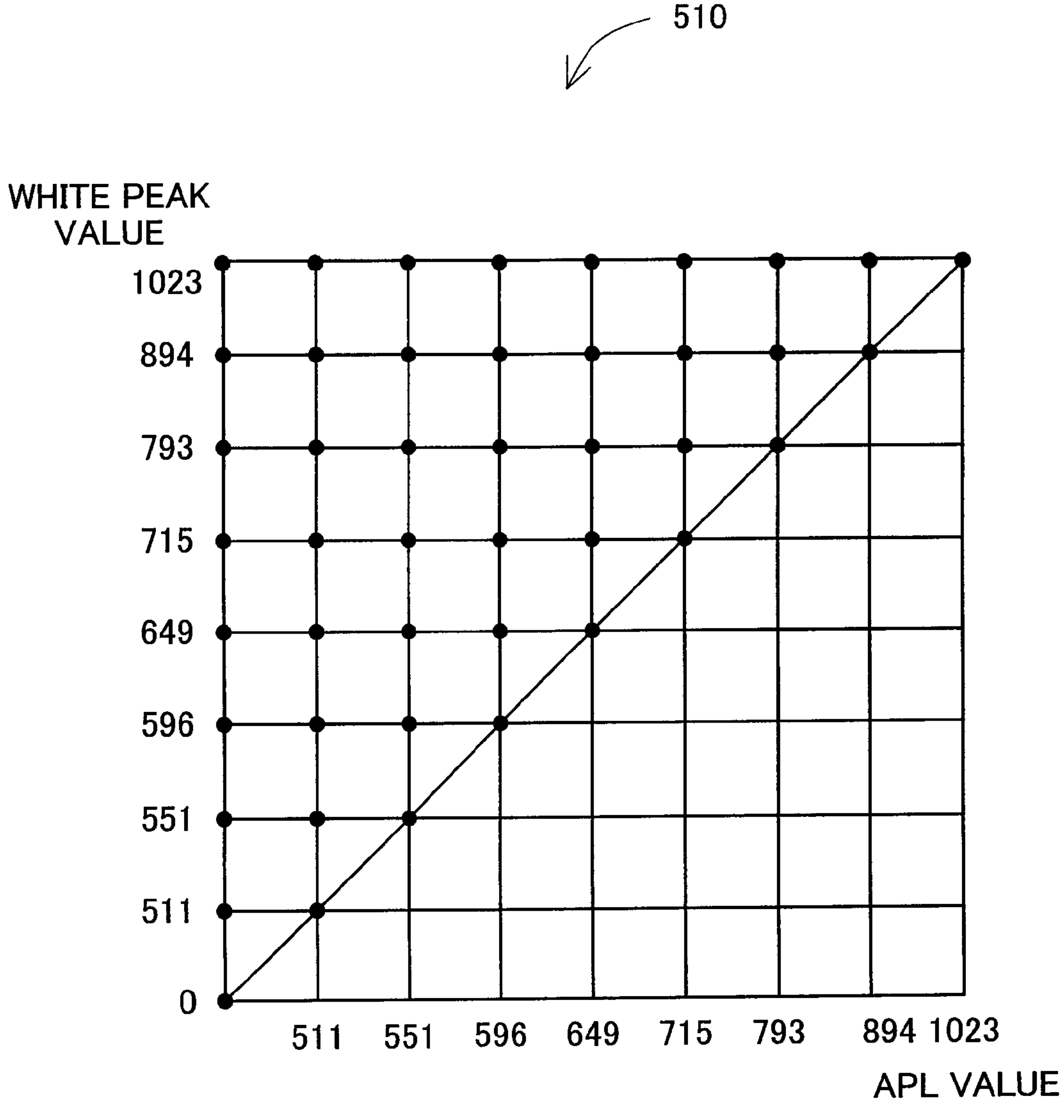
FIG. 6 illustrates a modulation coefficient LUT 510.

FIG. 6 illustrates a modulation coefficient LUT 510. The horizontal axis gives the APL value, and the vertical axis gives the white peak value WP. As will be understood from a comparison of FIG. 3 and FIG. 6, the modulation coefficient LUT 510 has the same arrangement as the expansion coefficient LUT 210. The method for determining the modulation coefficients Lc with reference to the modulation coefficient LUT 510 is also the same as the method for determining the expansion coefficients Gc, and is not described in detail.

The modulation control portion 600 calculates a brightness rate A1 given by Equation (7) below, and controls the light modulating element 700 on the basis of the brightness rate A1. The brightness rate A1 represents a proportion based on maximum brightness, such that $A1 \leqq 1$.

$$A1=Lc/255 \tag{7}$$

Where the brightness rate A1 and the expansion rate K1, which is calculated using Equation (6d) given previously, have the relation to one another given by Equation (8) below, the maximum luminance of an image subsequent to the luminance range expansion process and modulation control will be the same as the maximum luminance of an image prior to the luminance range expansion process and modulation control.

$$A1=K1^{-\gamma} \tag{8}$$

Here, γ is the γ value of the light valve 400; γ=2.2 for example. The modulation coefficient LUT 510 of FIG. 6 has been calculated from the expansion coefficient LUT 210 of FIG. 3 so that Gc in the LUT 210 and corresponding Lc in the LUT 510 fulfill the relational equation (8) including the equations (6d) and (7). Specifically, the modulation coefficients Lc of the modulation coefficient LUT 510 are established so as to fulfill Equation (9).

$$Lc/255=(1+Gc/255)^{-\gamma} \tag{9}$$

While the expansion coefficient LUT 210 and the modulation coefficient LUT 510 have here been set up in such a way that the maximum luminance of an image is unchanged prior and subsequent to the luminance range expansion process and modulation control, they could be set up using some other relational equation instead. For example, where the luminance range of image data has been expanded by a relatively large extent by the luminance range expansion process so that the image data has become lighter, it would be acceptable to increase the brightness further through modulation control, to make the image even lighter. Conversely, where the luminance range of image data has been expanded by a relatively small extent, it would be acceptable to reduce the brightness through modulation control.

According to the image display device of Embodiment 1 described above, the luminance range expansion process and modulation control are carried out depending on white peak values WP and APL values derived in relation to a luminance histogram of each image data, whereby the luminance range expansion process and modulation control can be carried out in a manner appropriate to the luminance of the image data. By so doing, the subjective contrast of the image can be improved. Additionally, by setting up the modulation coefficient LUT 510 using Equation (9), it becomes possible for the maximum luminance of an image to remain unchanged prior and subsequent to the luminance range expansion process and modulation control.

In Embodiment 1, the image feature quantity calculating portion 100 divides a single frame into small regions (See FIG. 2), then derives the representative luminances (or the mean luminances of the regions) of these small regions (See equation (3)), and calculates the APL value, which is the mean value of the representative luminances, and the white peak value WP, which is the maximum value of the representative luminances. Consequently, the effects of image noise can be minimized.

As a modification of Embodiment 1, it would also be possible to designate the maximum luminance and mean luminance of a small region present in a prescribed central portion of an image as the APL value and the white peak value WP, respectively. By so doing, it becomes possible to reduce the effects of captions or black bands produced at the edges of the image. Alternatively, the image feature quantity calculating portion 100, rather than dividing a single frame into small regions, may instead designate the maximum value of luminance among all of the pixels of the image data, and designate the mean value of luminance of all of the pixels as the APL value. That is, the luminance histogram of FIG. 5 may represent the luminance histogram of each pixel of the image data.

In Embodiment 1, the APL value was used as an image feature quantity, but it would be possible to use the black peak value, which represents the minimum value of the representative luminances Ydr1-Ydr40 of the small regions DRi, in place of the APL value. Alternatively, whereas in this embodiment, two values, namely the APL value and the white peak value WP, are used as the plurality of image feature quantities, it would be possible to instead use three values, namely, the white peak value WP, the APL value, and the black peak value. In this case, the expansion coefficient LUT 210 and the modulation coefficient LUT 510 will be 3 dimensional (hereinafter denoted as "–D") LUTs. It would also be acceptable to use an even greater number of image feature quantities. The plurality of image feature quantities are not limited to the white peak value WP, the APL value, and the black peak value, it being possible to establish various other values. The black peak value could also the minimum value of luminance for all pixels.

B. Embodiment 2

In Embodiment 2, the expansion coefficient and the modulation coefficient respectively output by the expansion coefficient determining portion 200 and the modulation coefficient determining portion 500 differ from those in Embodiment 1. The image data is moving picture data; the expansion coefficient determining portion 200 and the modulation coefficient determining portion 500 respectively derive expansion coefficients and modulation coefficients on a frame-by-frame basis, and output them. Other arrangements are the same as in Embodiment 1.

In the description hereinbelow, the expansion coefficient and the modulation coefficient of an n-th frame respectively output by the expansion coefficient determining portion 200 and the modulation coefficient determining portion 500 shall be denoted as G(n) and L(n) respectively. Accordingly, the expansion coefficient for the (n−1) frame shall be denoted as G(n−1). In the description it is assumed that the n-th frame is the current frame.

Figure 7:
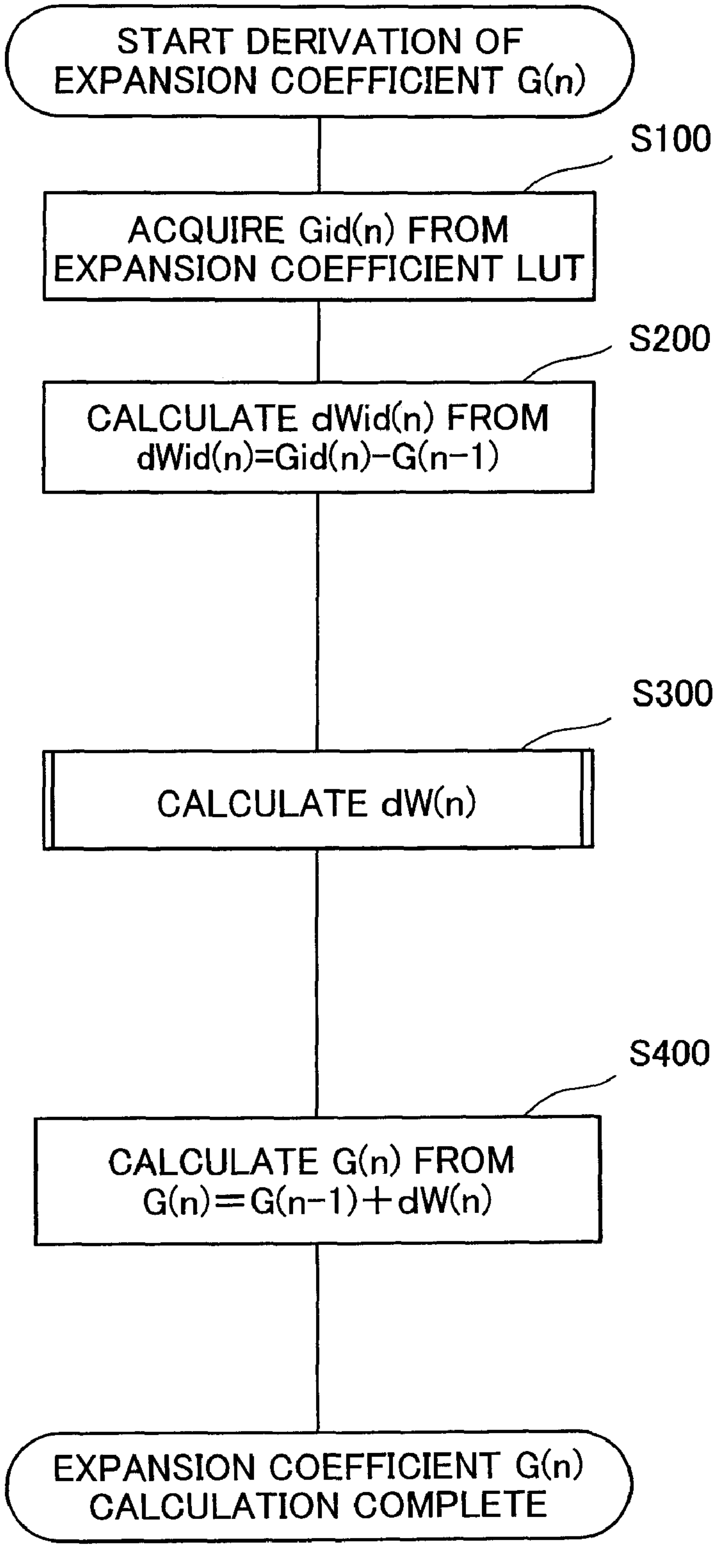
FIG. 7 is a Flowchart depicting the procedure of the process of deriving the expansion coefficient G(n)

FIG. 7 is a flowchart depicting the procedure of the process of deriving the expansion coefficient G(n). In the same manner as in Embodiment 1 (See FIG. 1), the expansion coefficient determining portion 200 calculates the expansion coefficient Gc for the n-th frame from the expansion coefficient LUT 210 of FIG. 3 (Step S100). This expansion coefficient Gc which is acquired from the LUT 210 for the n-th frame shall hereinafter be termed "the ideal expansion coefficient Gid(n) (Step S100)." On the contrary, the expansion coefficient which is to be actually used in each frame shall be termed "the actual expansion coefficient G(n)." The actual expansion coefficient G(n) is calculated based on the ideal expansion coefficient Gid(n).

Next, using the following Equation (10), the ideal change level Wid(n), which is the differential of the ideal expansion coefficient Gid(n) for the n-th frame and the actual expansion coefficient of the frame previous by one G(n−1) for the (n−1)-th frame, is calculated (Step S200).

$$dWid(n)=Gid(n)-G(n-1) \qquad (10)$$

The ideal change level Wid(n) corresponds to the level of change of the ideal expansion coefficient Gid(n) from the actual expansion coefficient of the frame previous by one G(n−1). The ideal change level Wid(n) corresponds to the ideal expansion modification volume in the present invention.

Subsequently, an actual change level dW(n) is acquired from the ideal change level Wid(n) by referring 1D-LUT 220 (Step S300). The actual change level dW(n) is the increment of the actual expansion coefficient G(n) of the n-th frame expansion coefficient determining portion from the actual expansion coefficient G(n−1) of the previous frame. Specifically, it fulfills the relationship of Equation (11).

$$dW(n)=G(n)-G(n-1) \qquad (11)$$

Once this actual change level dW(n) has been determined, then the actual expansion coefficient G(n) for the (n) frame can be calculated based on dW(n) and G(n−1) which is the expansion coefficient for the previous frame. The actual change level dW(n) corresponds to the expansion modification volume in the present invention.

Figure 8:
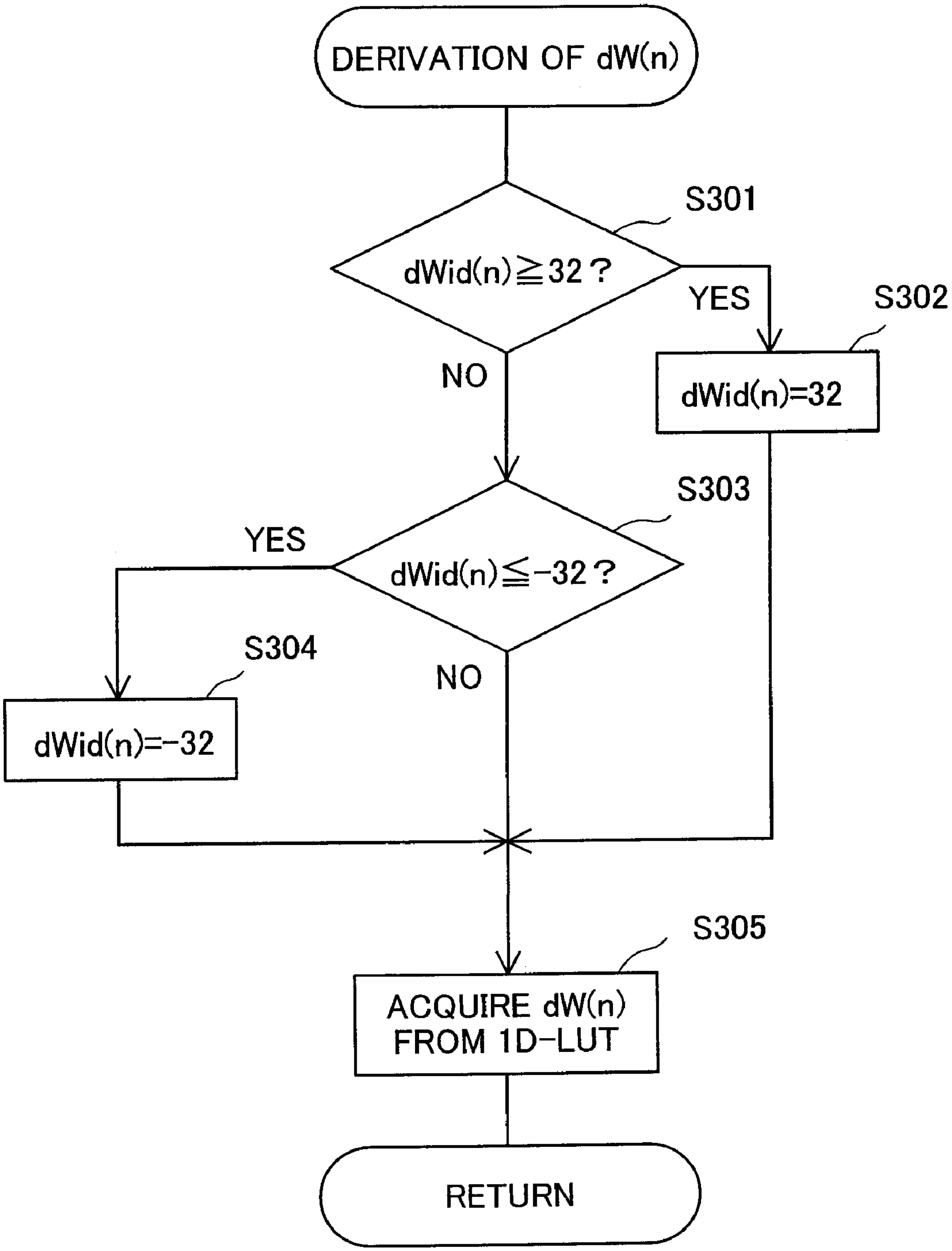
FIG. 8 is a Flowchart depicting the procedure of the process of deriving the actual change level dW(n)

FIG. 8 is a flowchart depicting the procedure of the process for deriving the actual change level dW(n). In the event that the ideal change level Wid(n) is 32 or greater (Step S301: YES), the expansion coefficient determining portion 200 substitutes the ideal change level Wid(n) with 32 (Step S302). In the event that the ideal change level Wid(n) is −32 or less (Step S303: YES), the ideal change level Wid(n) is substituted by −32 (Step S304). The reason for clipping the ideal change level Wid(n) in this way is in order to match the input range of the 1D-LUT 220 used to derive the actual change level dW(n) in Embodiment 2. The 1D-LUT 220 outputs the actual change level dW(n) depending on the ideal change level Wid(n) subsequent to clipping (Step S305).

Figure 9:
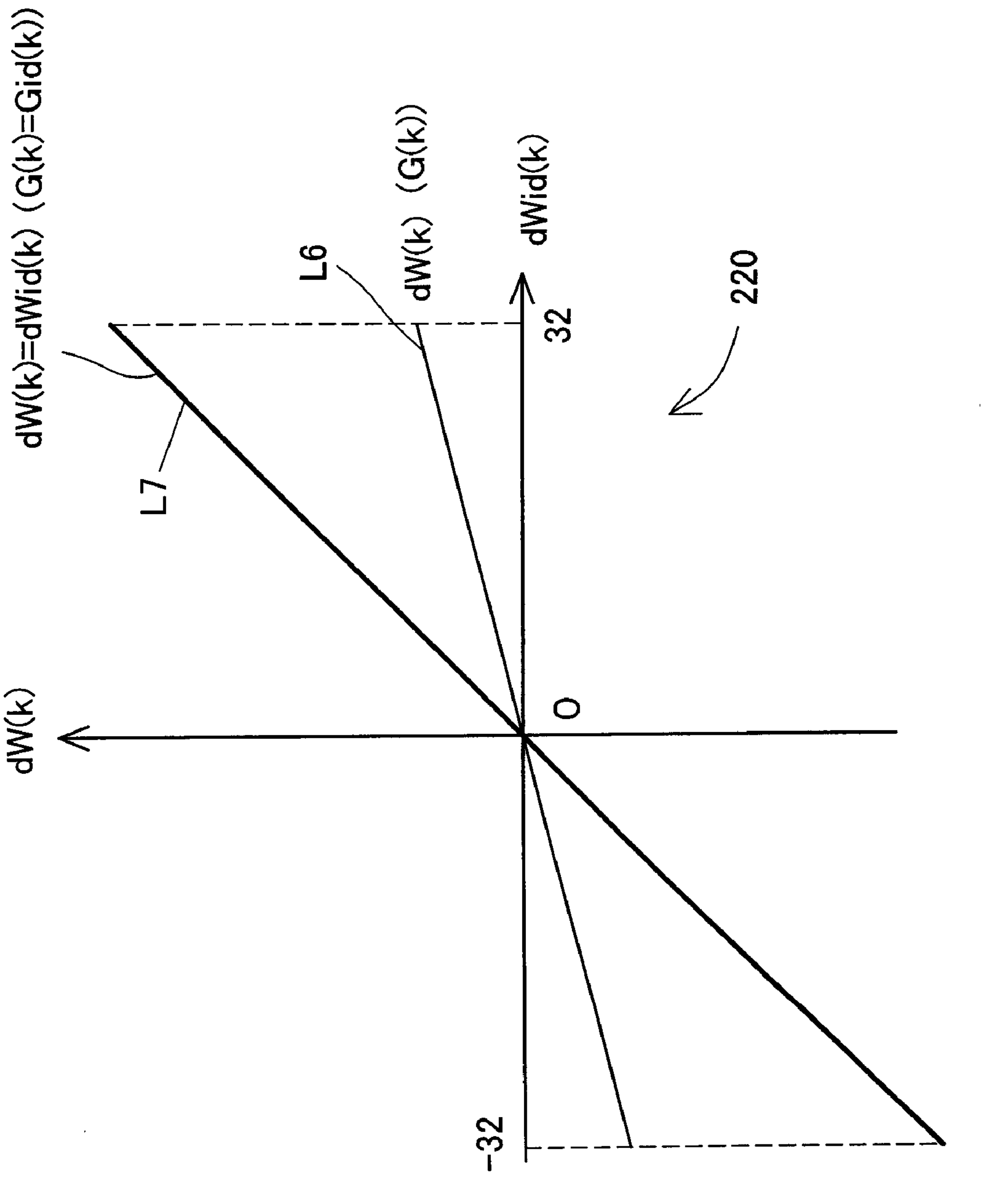
FIG. 9 illustrates input/output relationships of the 1D-LUT 220.

FIG. 9 depicts the input/output relationship of the 1D-LUT 220; the horizontal axis gives the ideal change level Wid(k), and the vertical axis gives the actual change level dW(k). k is an arbitrary positive integer. The relationship of the ideal change level dWid(k) and the actual change level dW(k) is shown by a straight line L6. The expansion coefficient determining portion 200 derives the actual change level dW(n) from the ideal change level dWid(n), using the straight line L6.

The expansion coefficient determining portion 200 calculates the actual expansion coefficient G(n) based on dW(n) and G(n−1), using Equation (12) which is a transformation of Equation (11) (Step S400 of FIG. 7).

$$G(n)=G(n-1)+dW(n) \quad (12)$$

In the event that the ideal change level Wid(n) is 0 (See Equation (10)), the actual change level dW(n) will also be 0 from the straight line L6, and the actual expansion coefficient G(n) of the current frame will equal the actual expansion coefficient G(n−1) of the previous frame. Since the straight line L6 is a straight line for calculating the actual expansion coefficient G(k), (G(k)) is shown in parentheses to the side of the straight line L6.

The straight line L7 of FIG. 9 is a straight line of an embodiment wherein the actual change level dW(k) and the ideal change level dWid(k) are equal. If it is assumed that the actual change level dW(k) is calculated using this straight line L7, the actual change level dW(k) will equal the ideal change level dWid(k). Then, {Gid(k)−G(k−1)} will equal {G(k)−G (k−1)} as will be understood from Equation (10) and Equation (11). Consequently, the expansion coefficient G(k) will equal the ideal expansion coefficient Gid(k). In FIG. 9, this is shown in parentheses to the side of the straight line L7. From the relationship between the straight line L6 and the straight line L7 it will be understood that, in Embodiment 2, the actual change level dW(k) is established in the 1D-LUT 220 as a value of the same sign as the ideal change level Wid(k), but having smaller absolute value.

Figure 10:
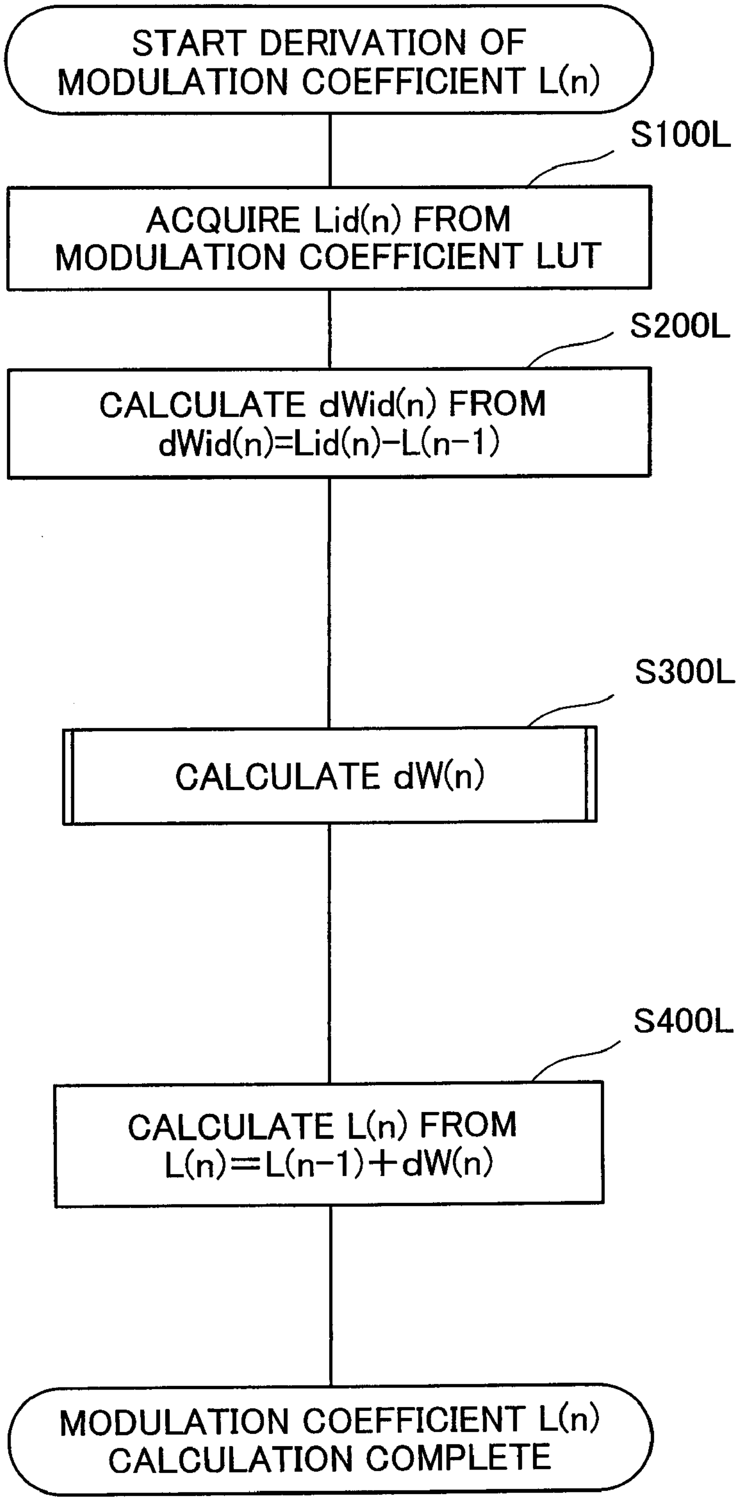
FIG. 10 is a Flowchart depicting the procedure of the process of deriving the modulation coefficient L(n)

FIG. 10 is a flowchart depicting the procedure for the process of deriving the modulation coefficient L(n). As will be apparent from a comparison of FIG. 7 and FIG. 10, the flowchart of FIG. 10 is equivalent to substituting G relating to the expansion coefficient of FIG. 7 with L relating to the modulation coefficient; since the procedure for deriving the modulation coefficient L(n) is the same as the procedure for deriving the expansion coefficient G(n), it is not described. It should be noted that the ideal modulation coefficient Lid(n) is the modulation coefficient Lc for the n-th frame acquired from the modulation coefficient LUT 510 of FIG. 6 in Embodiment 1.

As the 1D-LUT used when deriving the actual change level dW(n) of Step S300L, it is possible to use a 1D-LUT same as the 1D-LUT 220 of FIG. 9, or one prepared separately. Even where prepared separately, in the 1D-LUT the actual change level dW(k) will preferably be established as a value of the same sign as the ideal change level Wid(k), but having smaller absolute value.

Equation (10a) is a transformation of Equation (10).

$$Gid(n)=G(n-1)+dWid(n) \quad (10a)$$

According to the image display device 1000 of Embodiment 2, the actual expansion coefficient G(n) (See Equation (12)) is used in place of the ideal expansion coefficient Gid(n) (Equation (10a)). The actual expansion coefficient G(n) is determined based on the actual expansion coefficient G(n−1) of the previous frame and the actual change level dW(n). The actual change level dW(n) is determined based on the corrected dWid(n) (See FIGS. 8 and 9), and has a value of the same sign as the ideal change level Wid(n), but smaller absolute value. As will be apparent from Equation (12) and Equation (10a), the actual expansion coefficient G(n) has a smaller differential from the actual expansion coefficient G(n−1) of the previous frame than does the ideal expansion coefficient Gid(n). That is, by using this actual expansion coefficient G(n), sharp change in the expansion coefficient from the expansion coefficient G(n−1) of the previous frame can be reduced to a greater extent than if the ideal expansion coefficient Gid(n) were used.

For example, in the event that either of the following two inequality expressions (13), (14) is true, the ideal expansion coefficient Gid(n−1) of the previous frame and the ideal expansion coefficient Gid(n) of the current frame will vary appreciably to either side of the actual expansion coefficient G(n−1) of the previous frame. Accordingly, supposing that the ideal expansion coefficient Gid(n) is used as-is as the actual expansion coefficient of the current frame, it is possible that flicker will occur in the picture.

$$Gid(n-1)>G(n-1)>Gid(n) \quad (13)$$

$$Gid(n-1)<G(n-1)<Gid(n) \quad (14)$$

In Embodiment 2, the corrected actual expansion coefficient G(n) is used in place of the ideal expansion coefficient Gid(n) and the G(n) has a smaller differential from the actual expansion coefficient G(n−1) of the previous frame than does the ideal expansion coefficient Gid(n). Accordingly, it is possible to suppress flicker.

Similarly, by using the corrected actual modulation coefficient L(n), sharp change in the modulation coefficient from the modulation coefficient L(n−1) of the previous frame can be reduced to a greater extent than the case where the ideal modulation coefficient Lid(n) were used.

In Embodiment 2, the expansion coefficient determining portion 200 subtracts the actual expansion coefficient G(n−1) of the previous frame from the ideal expansion coefficient Gid(n) of the current frame to calculate the ideal change level dWid(n) (See Equation (10)). The expansion coefficient determining portion 200 calculates an actual expansion coefficient G(n) for the current frame. The absolute value of the actual change level dW(n), which is increment of the actual expansion coefficient G(n) of the current frame from the actual expansion coefficient G(n−1) of the previous frame, is smaller than the absolute value of the ideal change level dWid(n). The actual change level dW(n) has the same sign as the ideal change level dWid(n). That is, the expansion coefficient determining portion 200 of Embodiment 2 corresponds to the expansion correcting portion of the present invention.

Since the input/output characteristics of the 1D-LUT 220 are origin-symmetric in Embodiment 2, it would be acceptable to place in memory only the positive regions or the negative regions of the 1D-LUT 220. Alternatively, it would be acceptable to place in memory only such actual change levels dW(k) that corresponds to the ideal change levels dWid (k) which are integers (See FIG. 9). In this arrangement, in the event that the input ideal change level dWid(n) is not an integer, the actual change level dW(k) would be calculated through interpolation.

In Embodiment 2, for the sake of simplicity the 1D-LUT 220 has been shown by a straight line L6; however, a straight line is not mandatory, it being possible to establish various other shapes such as a curve or inflected line. Alternatively, since it is sufficient for the actual change level dW(n) to have the same sign as the ideal change level dWid(n) but a smaller absolute value, it is possible to derive it by various other methods than that using the 1D-LUT 220. For example, the actual change level dW(n) could be calculated by dividing the ideal change level dWid(n) by a constant greater than 1.

In Embodiment 2, the actual change level dW(n) relating to the modulation coefficient L(n) is calculated separately from the actual change level dW(n) relating to the expansion coefficient G(n) (See Step S300 of FIG. 7 and Step S300L of FIG. 10), but values having the same absolute values but different signs could be used instead. This is because where the relationship of the expansion coefficient G(n) and the modulation coefficient L(n) is such that when one increases the other decreases by the same amount, sharp change in the look of an image can be suppressed. In such an arrangement, one of the expansion coefficient G(n) and the modulation coefficient L(n) can be acquired from another by changing its sign.

C. Embodiment 3

Embodiment 3 differs from Embodiment 2 in the way in which the actual change level dW(n) is calculated in Step S300 of FIG. 7, but in other respects is the same as Embodiment 2.

In Embodiment 3, as indicated by Equation (15) below, the actual change level dW(n) of the n-th frame is calculated by multiplying the change level dW1(*n*) of the n-th frame by a correction coefficient ScaleG(n). The correction coefficient ScaleG(n) is set to a number equal to or greater than 1 under some conditions. The correction coefficient ScaleG(n) is set to zero under other condition.

$$dW(n)=dW1(n)*\mathrm{Scale}G(n) \tag{15}$$

Figure 11:
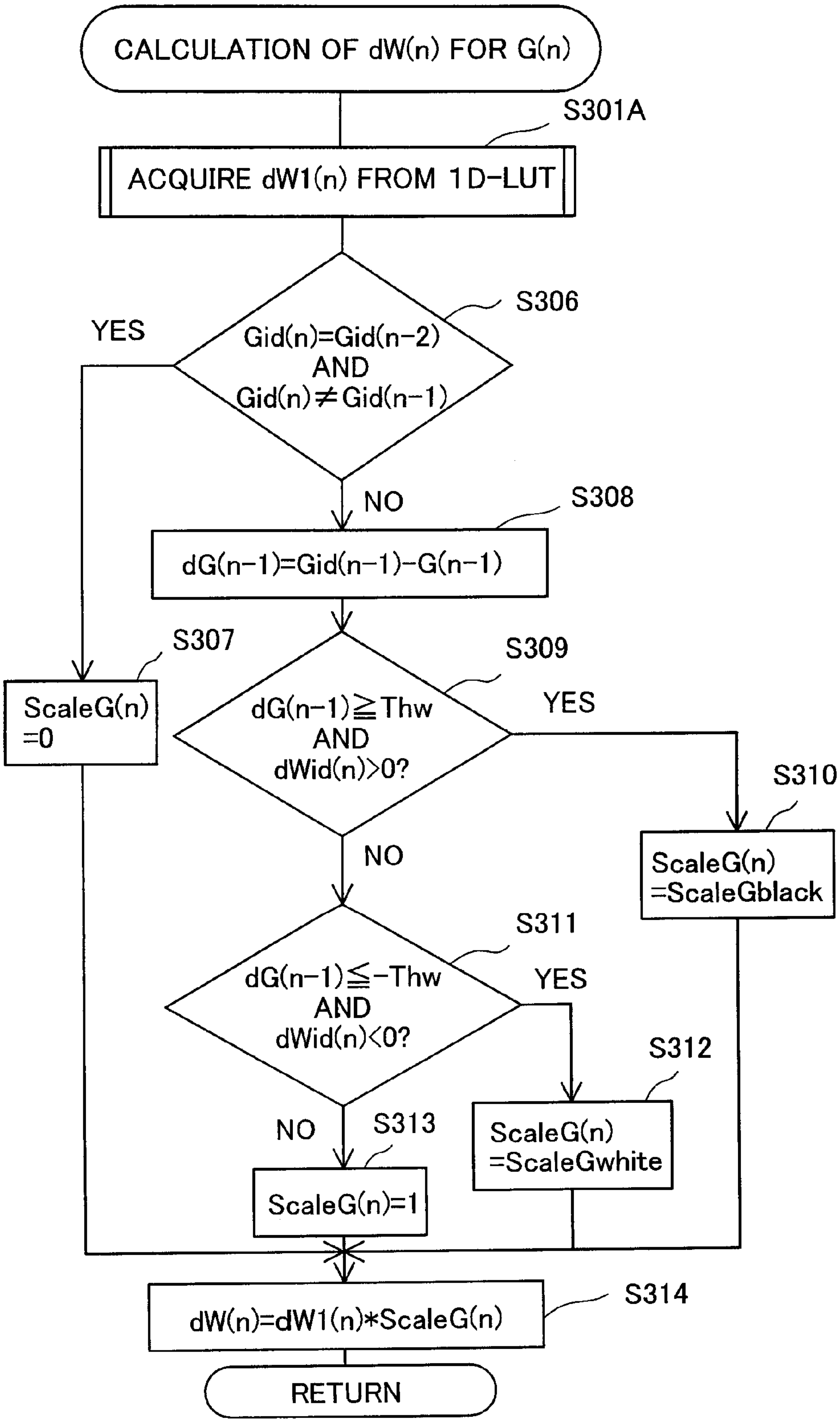
FIG. 11 is a Flowchart depicting the procedure for the process of deriving the actual change level dW(n) in Embodiment 3.

FIG. 11 is a flowchart depicting the procedure for the process of deriving the actual change level dW(n) in Embodiment 3. First, by the procedure shown in the flowchart of FIG. 8 in Embodiment 2, the expansion coefficient determining portion 200 calculates the actual change level dW(n) from the 1D-LUT 220 of FIG. 9 (Step S301A). In Embodiment 3, this change level dW(n) which is acquired from the LUT 210 for the n-th frame shall hereinafter be termed change level dW1 (*n*) (Step S301A). In Embodiment 3, the actual change level dW(n) for the n-th frame is calculated from this change level dW1(*n*) (See Equation (15)).

In the following Steps S306 through S313 of FIG. 11, the expansion coefficient determining portion 200 calculates the correction coefficient ScaleG(n).

In the event that both the following Equation (16) and Equation (17) are true (Step S306: YES), the expansion coefficient determining portion 200 sets the correction coefficient ScaleG(n) to 0 (Step S307).

$$Gid(n)=Gid(n-2) \tag{16}$$

$$Gid(n)\neq Gid(n-1) \tag{17}$$

In case where at least one of Equation (16) and Equation (17) is false (Step S306: NO), the expansion coefficient determining portion 200 executes Step S308. Specifically, the expansion coefficient determining portion 200 calculates with Equation (18) a correction level dG(n−1) which represents the differential of the ideal expansion coefficient Gid (n−1) of the (n−1)-th frame and the actual expansion coefficient G(n−1) of the (n−1)-th frame (Step S308).

$$dG(n-1)=Gid(n-1)-G(n-1) \tag{18}$$

In Step S309, in the event that correction level dG(n−1) of the previous frame is equal to or greater than a threshold value Thw, and the ideal change level dWid(n) of the current frame is greater than 0 (Step S309: YES), the correction coefficient ScaleG(n) is set to a prescribed black correction coefficient ScaleGblack (Step S310). The prescribed black correction coefficient ScaleGblack is greater than 1.

In case where the decision in Step S309 is false (Step S309: NO), the expansion coefficient determining portion 200 executes Step S311. Specifically, if the correction level dG(n−1) of the previous frame is equal to or less than −Thw, and the ideal change level dWid(n) of the current frame is less than 0 (Step S311: YES), the correction coefficient ScaleG(n) is set to a prescribed white correction coefficient ScaleGwhite (Step S312). The prescribed black correction coefficient ScaleGwhite is greater than the prescribed black correction coefficient ScaleGblack. The following inequality expression (19) is true for the correction coefficient values.

$$1<\mathrm{Scale}G\mathrm{black}<\mathrm{Scale}G\mathrm{white} \tag{19}$$

In case where the decision in Step S311 is false (Step S311: NO), the expansion coefficient determining portion 200 executes Step S313. Specifically, the correction coefficient ScaleG(n) is set to 1 (Step S313).

According to Steps S306 through S313 of FIG. 11, the correction coefficient ScaleG (n) is determined.

In Step S314, the actual change level dW(n) is then calculated with Equation (15) using the change level dW1(*n*) (See Step S301A) and the correction coefficient ScaleG(n) (See Steps S307, S310, S312, S313).

Figure 12:
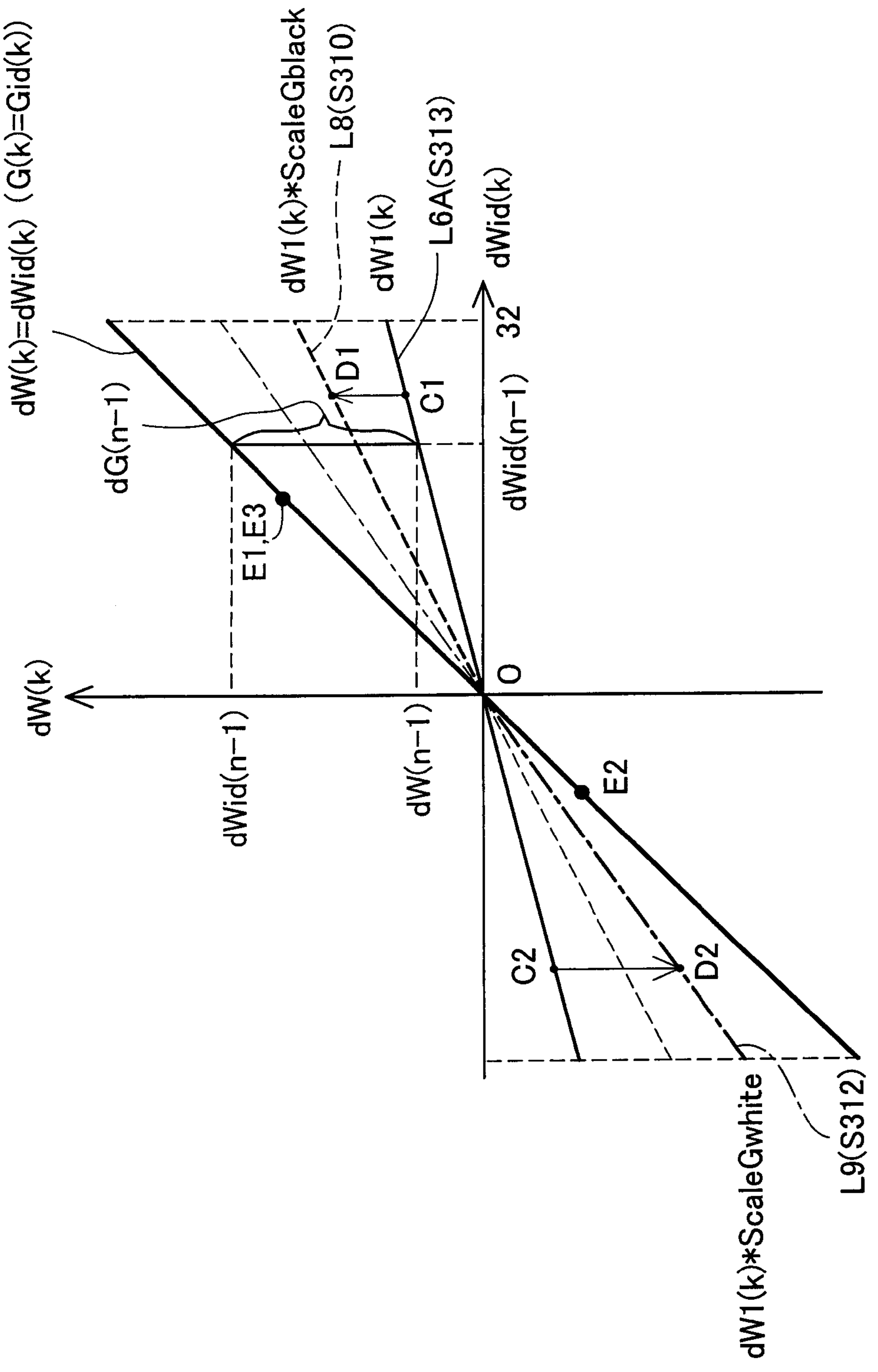
FIG. 12 illustrates the conceptual approach for setting the correction coefficient ScaleG(n)

FIG. 12 is an illustration of the conceptual approach for setting the correction coefficient ScaleG(n). The straight line L6A of FIG. 12 is the same as the straight line L6 of FIG. 9; a straight line L8 and a straight line L9 have been added to it. The straight line L8 is a line indicating the actual change level dW(k) in the case where the correction coefficient ScaleG(k) is the black correction coefficient ScaleGblack (See Step S310 of FIG. 11). The straight line L9 is a line indicating the actual change level dW(k) in the case where the correction coefficient ScaleG(k) is the white correction coefficient ScaleGwhite (See Step S312). The straight line L6A is a line indicating the actual change level dW(k) in the case where the correction coefficient ScaleG(k) is 1 (See Step S313).

From the relationships of the lines, using the white correction coefficient ScaleGwhite, the actual change level dW(k) will be closer to the ideal change level dWid(k) than it is using the black correction coefficient ScaleGblack. In such case, as will be apparent from Equation (12) and Equation (10a), the actual expansion coefficient G(k) is also closer to the ideal expansion coefficient Gid(k).

Similarly, using the black correction coefficient ScaleGblack, the actual change level dW(k) will be closer to the ideal change level dWid(k) than it is using the correction coefficient ScaleG=1. In such case, the actual expansion coefficient G(k) is also closer to the ideal expansion coefficient Gid(k) (See Equation (12) and Equation (10a)). The correction coefficients ScaleGblack, ScaleGwhite are set up such that the actual change level dW(k) does not exceed the ideal change level dWid(k).

Figure 13:
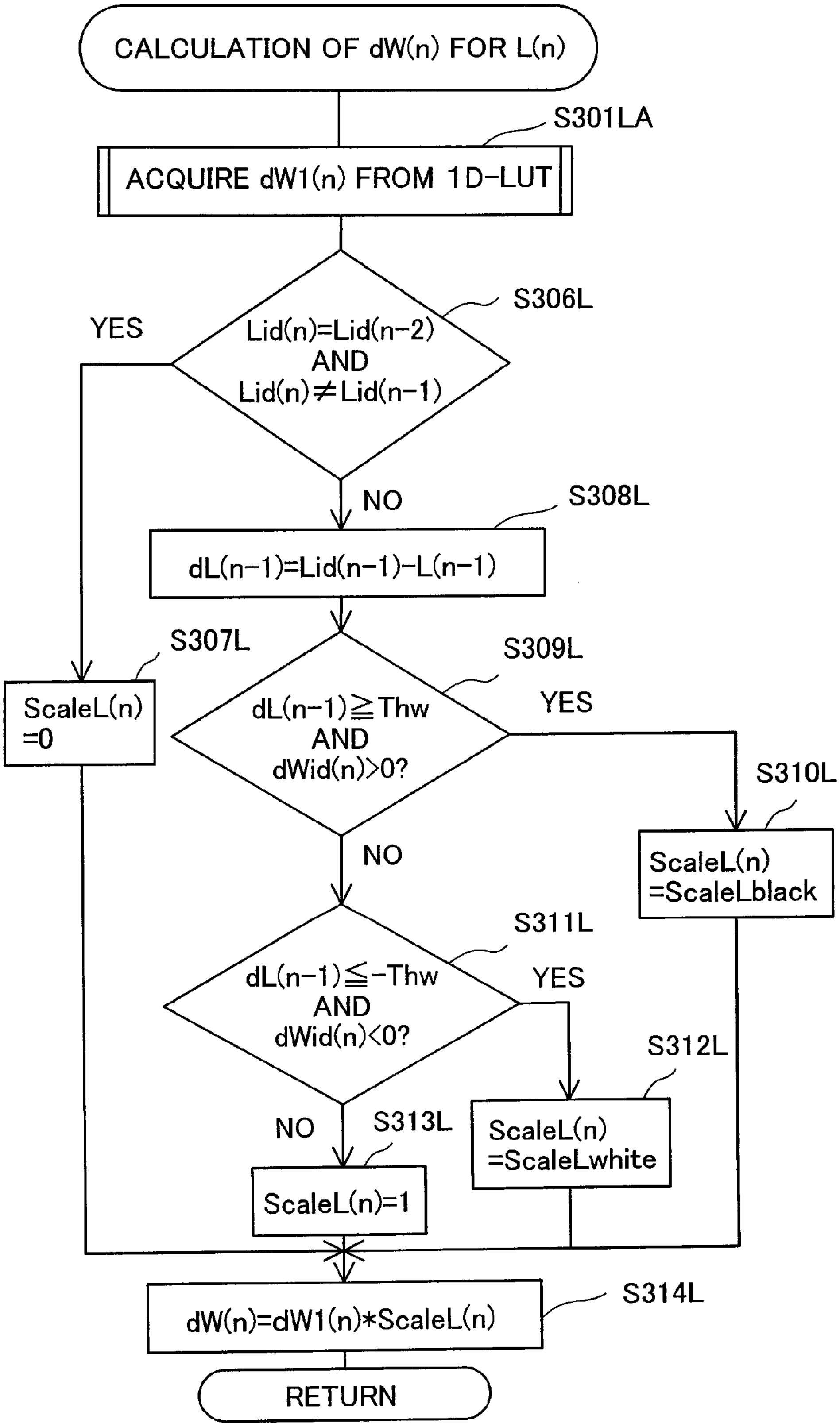
FIG. 13 is a Flowchart depicting the procedure for the process of deriving the actual change level dW(n) of the modulation coefficient L(n).

FIG. 13 is a flowchart depicting the procedure for the process of deriving the actual change level dW(n) of the modulation coefficient L(n). In symbol denotation, L is used in relation to the modulation coefficient, in the same way as in Embodiment 2. The flowchart of FIG. 13 is equivalent to the flowchart of FIG. 11 with L relating to the modulation coefficient being substituted for G relating to the expansion coefficient, and the procedure for the process of deriving the actual change level dW(n) of the modulation coefficient L(n) is the same as the procedure for the process of deriving the actual change level dW(n) of the expansion coefficient G(n). Thus no description is required.

According to the image display device 1000 of Embodiment 3, by setting the correction coefficients ScaleG(n), ScaleL(n), it is possible to adjust the magnitude of the actual change level dW(n) according to conditions. Accordingly, it is possible to adjust the change of the actual expansion coefficient G(n) of the current frame from the actual expansion coefficient G(n−1) of the previous frame.

For example, in Step S306 of FIG. 11, when the ideal expansion coefficient Gid(n−2) of the (n−2) frame and the ideal expansion coefficient Gid(n) of the (n)-th frame are equal to each other, but these are not equal to the ideal expansion coefficient Gid(n−1) of the(n−1) frame, the ideal change levels dWid(n−2), dWid(n−1), dWid(n) relating to these ideal expansion coefficients Gid(n−2), Gid(n−1), Gid(n) will correspond respectively to input values at points E1, E2, and E3 in FIG. 12, for example. In such arrangement, the ideal expansion coefficient Gid(k) is oscillating. In such a case, it is possible for flicker to occur when the actual expansion coefficient G(n) is determined on the basis of the ideal expansion coefficient Gid(n) of the current frame.

In Embodiment 3, in such a case the correction coefficient ScaleG(n) is set to 0 in Step S307 so that the actual expansion coefficient G(n) of the current frame has the same value as the actual expansion coefficient G(n−1) of the previous frame, thereby suppressing flicker. The expansion coefficient determining portion 200 corresponds to the expansion substituting portion of the present invention. It is also possible to dispense with the process of Step S307.

In Step S309 of FIG. 11, the fact that the correction level dG(n−1) of the previous frame (See Equation (18)) is equal to or greater than the threshold value Thw means that the differential between the ideal expansion coefficient Gid(n−1) and the actual expansion coefficient G(n−1) of the previous frame is too wide. The fact that the differential between the ideal expansion coefficient Gid(n−1) and the actual expansion coefficient G(n−1) is extremely wide means that the ideal expansion coefficient Gid(n−1) is extremely large, which also means that the image prior to the luminance range expansion process is very dark (See FIG. 5(*b*) comparing to FIGS. 5(*a*) and (*c*)).

Here, as will be understood from the following computational equation using Equation (10a) and Equation (12), the correction level dG(n−1) represents the differential between the ideal change level Wid(n−1) and the actual change level dW(n−1).

$$\begin{aligned} dG(n-1) &= Gid(n-1) - G(n-1) \\ &= \{G(n-2) + dWid(n-1)\} - \{G(n-2) + dW(n-1)\} \\ &= dWid(n-1) - dW(n-1) \end{aligned} \quad (20)$$

The range dG(n−1) is shown in FIG. 12 (where the correction coefficient ScaleG(n−1) was assumed to be 1).

Accordingly, in the current frame (n-th frame), by calculating the actual change level dW(n) using the black correction coefficient ScaleGblack which is greater than 1 (See Equation (15)), the actual change level dW(n) comes closer to the ideal change level dWid(n) (See FIG. 12). Consequently, the actual expansion coefficient G(n) comes closer to the ideal expansion coefficient Gid(n) (See Equation (12) and (10a)) than where the correction coefficient ScaleG(n)=1 is used. This corresponds to the change from, for example, the point C1 in the case where the correction coefficient ScaleG(n)=1 is used to the point D1 where the black correction coefficient ScaleGblack is used, in FIG. 12. Here, the image can be lightened by carrying out the luminance range expansion process with an expansion coefficient G(n) closer to the ideal expansion coefficient Gid(n).

Since the condition of Step S311 is a relationship opposite from the condition of Step S309, so that the following inequality expression (21) is true, it means that the ideal expansion coefficient Gid(n−1) is extremely small. That is, it means that the image is extremely light (See FIG. 5(*c*) comparing to FIGS. 5(*a*) and (*b*)).

$$G(n-1) - Gid(n-1) \geqq Thw \quad (21)$$

Accordingly, in order to prevent overexposure, it is desirable to bring the expansion coefficient G(n) even closer to the ideal expansion coefficient Gid(n) than is the case where the image is extremely dark (See Steps S309, S310). According to this embodiment, since in Steps S311, S312 the actual change level dW(n) is computed using the white correction coefficient ScaleGwhite which is greater than the black correction coefficient ScaleGblack, the actual change level dW(n) comes further closer to the ideal change level Wid(n) (See FIG. 12). Consequently, the expansion coefficient G(n) can be made further closer to the ideal expansion coefficient Gid(n), and overexposure can be prevented. This corresponds to the change from, for example, the point C2 in the case where the correction coefficient ScaleG(n)=1 is used to the point D2 where the white correction coefficient ScaleGwhite is used, in FIG. 12.

The process of Steps S309-S312 corresponds to the process as follows. In the process, in the event that the absolute value of the differential dG(n−1) of the ideal expansion coefficient Gid(n−1) of the previous frame and the actual expansion coefficient G(n−1) of the previous frame is equal to or greater than a prescribed threshold value Thw (See Steps S309 and S311), the actual expansion coefficient G(n) is calculated as follows. Specifically, the actual expansion coefficient G(n) is calculated such that the absolute value of actual change level dW(n) is greater than it would be in the case that the absolute value of the differential dG(n−1) were smaller than the threshold value Thw (See lines L6A and L8 in FIG. 12). The expansion coefficient determining portion 200 of Embodiment 3 corresponds to the expansion correction portion of the present invention.

In the event that the ideal change level dWid(n) is a negative value, the expansion coefficient determining portion 200 calculates the expansion coefficient G(n) such that the absolute value of actual change level dW(n) is greater than it would be in the case that the ideal change level dWid(n) were a positive value same as the absolute value (See lines L9 and L8 in FIG. 12).

In this embodiment, the size of the absolute value of the actual change level dW(n) is adjusted using the correction coefficient ScaleG(n) (See Equation (15)), but is not limited to this arrangement, it being acceptable to instead calculate the actual change level dW(n) by dividing the ideal change level dWid(n) by a constant greater than 1, appropriate to the case in each of the Steps S310, S312, S313.

In the event that none of the conditions of Steps S306, S309 or S311 apply, effects similar to those of Embodiment 2 can be obtained by setting the correction coefficient ScaleG(n) to 1 (See Step S313 of FIG. 12).

In Embodiment 3, the correction coefficient ScaleL relating to the modulation coefficient L(n) is calculated separately from the correction coefficient ScaleG relating to the expansion coefficient G(n). However, the same value may be used for both the expansion coefficient G(n) and the modulation coefficient L(n). Also, the same value may be used for both the black correction coefficient ScaleGblack and the white correction coefficient ScaleGwhite.

Other Embodiments (1) Whereas in the preceding embodiments, the luminance range expansion process and modulation control are both carried out (See FIG. 1), it would be acceptable to instead carry out one or the other.

(2) The image display device of the present invention is applicable to various kinds of image display devices besides projectors, such as LCD TVs, for example. Where only the luminance range expansion process is carried out without performing modulation control, there is no need to provide the light source unit 710

The Program product may be realized as many aspects. For example:

(i) Computer readable medium, for example the flexible disks, the optical disk, or the semiconductor memories;

(ii) Data signals, which comprise a computer program and are embodied inside a carrier wave;

(iii) Computer including the computer readable medium, for example the magnetic disks or the semiconductor memories; and (iv) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An image display device for displaying an image on the basis of image data comprising:

an image feature quantity calculating portion which calculates a plurality of image feature quantities based on a luminance histogram of the image data;

an expansion coefficient determining portion which determines an expansion coefficient based on the plurality of image feature quantities by referring to a predetermined expansion coefficient lookup table; and a luminance range expansion processing portion which performs a luminance range expansion process on the image data using the expansion coefficient, the luminance range expansion process being a process to extend a range of luminances of the image data, wherein:

the image data is moving picture data, the expansion coefficient determining portion determines the expansion coefficient for each frame of the moving picture data by referring to the predetermined expansion coefficient lookup table, and the image display device further comprises:

an expansion correcting portion which:

determines an expansion modification volume of which an absolute value is smaller than an absolute value of an ideal expansion modification volume, the ideal expansion modification volume being a differential of a current frame ideal expansion coefficient from a previous frame expansion coefficient, the current frame ideal expansion coefficient being an expansion coefficient determined by the expansion coefficient determining portion based on the plurality of image feature quantities of a current frame referring to the predetermined expansion coefficient lookup table, the previous frame expansion coefficient being an expansion coefficient used in the luminance range expansion process of a previous frame; and generates a current frame expansion coefficient by correcting the current frame ideal expansion coefficient using the expansion modification volume, and the luminance range expansion processing portion performs the luminance range expansion process on the image data based on the current frame expansion coefficient as the expansion coefficient.

2. The image display device according to claim 1 wherein the luminance histogram is a frequency distribution of mean luminance values of pixels in a plurality of small regions into which an area of the image has been divided.

3. The image display device according to claim 1 wherein the plurality of image feature quantities include:

a white peak value which represents a maximum luminance in the luminance histogram; and at least one of a mean value of the luminance histogram and a minimum value of the luminance histogram.

4. The image display device according to claim 1 wherein in case where an absolute value of a previous expansion modification volume is smaller than a predetermined threshold, the expansion correcting portion determines a first value as the expansion modification volume based on the ideal expansion modification volume, the previous expansion modification volume being a differential of the previous frame expansion coefficient from a previous frame ideal expansion coefficient, the previous frame ideal expansion coefficient being an expansion coefficient determined by the expansion coefficient determining portion based on the plurality of image feature quantities of the previous frame referring to the predetermined expansion coefficient lookup table, and in case where the absolute value of the previous expansion modification volume is equal to or greater than the predetermined threshold, the expansion correcting portion determines a second value as the expansion modification volume based on the ideal expansion modification volume, wherein an absolute value of the second value is greater than an absolute value of the first value in case where the ideal expansion modification volumes are same.

5. The image display device according to claim 4 wherein in case where the absolute value of the previous expansion modification volume is equal to or greater than the predetermined threshold and the ideal expansion modification volume is a positive value, the expansion correcting portion determines a third value as the second value, and in case where the absolute value of the previous expansion modification volume is equal to or greater than the predetermined threshold and the ideal expansion modification volume is a negative value, the expansion correcting portion determines a fourth value as the second value, wherein an absolute value of the fourth value is greater than an absolute value of the third value in case where the ideal expansion modification volumes are same.

6. The image display device according to claim 1 wherein the image data is moving picture data, the expansion coefficient determining portion determines the expansion coefficient for each frame of the moving picture data by referring to the predetermined expansion, coefficient lookup table, the image display device further comprising an expansion substituting portion which, in case where a current frame ideal expansion coefficient equals a second previous frame ideal expansion coefficient, but does not equal a first previous frame ideal expansion coefficient, substitutes the current frame ideal expansion coefficient with a first previous frame expansion coefficient to generate a current frame expansion coefficient, the current frame ideal expansion coefficient being an expansion coefficient determined by the expansion coefficient determining portion based on the plurality of image feature quantities of a current frame referring to the predetermined expansion coefficient lookup table, the first previous frame ideal expansion coefficient being an expansion coefficient determined by the expansion coefficient determining portion based on the plurality of image feature quantities of a frame previous by one the current frame referring to the predetermined expansion coefficient lookup table, the second previous frame ideal expansion coefficient being an expansion coefficient determined by the expansion coefficient determining portion based on the plurality of image feature quantities of a frame previous by two the current frame referring to the predetermined expansion coefficient lookup table, the first previous frame expansion coefficient being an expansion coefficient used in the luminance range expansion process of the frame previous by one the current frame, and the luminance range expansion processing portion performs the luminance range expansion process on the image data using the current frame expansion coefficient as the expansion coefficient.

7. The image display device according to claim 1 further comprising:

a lighting device;

a modulation coefficient determining portion which determines a modulation coefficient based on the plurality of image feature quantities by referring to a predetermined modulation coefficient lookup table, the modulation coefficient representing a brightness of light of the lighting device; and a light modulating portion which modulates the light of the lighting device based on the modulation coefficient.

8. The image display device according to claim 7 wherein the expansion coefficient lookup table and the modulation coefficient lookup table are set up such that maximum luminance of the image is unchanged prior and subsequent to execution of both the luminance range expansion process and modulation.

9. An image display method for displaying an image based on image data, comprising:

calculating a plurality of image feature quantities based on a luminance histogram of the image data;

determining an expansion coefficient based on the plurality of image feature quantities by referring to a predetermined expansion coefficient lookup table; and performing a luminance range expansion process on the image data using the expansion coefficient, the luminance range expansion process being a process to extend a range of luminances of the image data, wherein:

the image data is moving picture data, determining the expansion coefficient includes determining the expansion coefficient for each frame of the moving picture data by referring to the predetermined expansion coefficient lookup table, the image display method further comprises:

determining an expansion modification volume of which an absolute value is smaller than an absolute value of an ideal expansion modification volume, the ideal expansion modification volume being a differential of a current frame ideal expansion coefficient from a previous frame expansion coefficient, the current frame ideal expansion coefficient being an expansion coefficient determined based on the plurality of image feature quantities of a current frame referring to the predetermined expansion coefficient lookup table, the previous frame expansion coefficient being an expansion coefficient used in the luminance range expansion process of a previous frame; and generating a current frame expansion coefficient by correcting the current frame ideal expansion coefficient using the expansion modification volume, and the luminance range expansion process is performed on the image data based on the current frame expansion coefficient as the expansion coefficient.

* * * * *